United States Patent
Kim

(10) Patent No.: US 11,416,408 B2
(45) Date of Patent: Aug. 16, 2022

(54) MEMORY SYSTEM, MEMORY CONTROLLER AND METHOD FOR OPERATING MEMORY SYSTEM

(71) Applicant: SK hynix Inc., Icheon-si (KR)

(72) Inventor: Byung Jun Kim, Seoul (KR)

(73) Assignee: SK hynix Inc., Icheon-si (KR)

( * ) Notice: Subject to any disclaimer, the term of this patent is extended or adjusted under 35 U.S.C. 154(b) by 34 days.

(21) Appl. No.: 16/721,716

(22) Filed: Dec. 19, 2019

(65) Prior Publication Data

US 2021/0004330 A1    Jan. 7, 2021

(30) Foreign Application Priority Data

Jul. 5, 2019 (KR) .......................... 10-2019-0081023

(51) Int. Cl.
| | |
|---|---|
| G06F 12/0873 | (2016.01) |
| G06F 12/02 | (2006.01) |
| G06F 11/30 | (2006.01) |
| G06F 9/50 | (2006.01) |
| G06F 13/16 | (2006.01) |
| G06F 9/48 | (2006.01) |

(52) U.S. Cl.
CPC ........ G06F 12/0873 (2013.01); G06F 9/4837 (2013.01); G06F 9/5016 (2013.01); G06F 11/3037 (2013.01); G06F 12/0246 (2013.01); G06F 13/1668 (2013.01); G06F 2212/7201 (2013.01)

(58) Field of Classification Search
CPC ............. G06F 12/0873; G06F 12/0246; G06F 9/4837; G06F 9/5016; G06F 11/3037; G06F 13/1668; G06F 2212/7201
See application file for complete search history.

(56) References Cited

U.S. PATENT DOCUMENTS

| | | |
|---|---|---|
| 5,459,850 A | 10/1995 | Clay et al. |
| 9,164,888 B2 | 10/2015 | Borchers et al. |
| 9,195,396 B2 | 11/2015 | Peterson et al. |
| 9,378,135 B2 | 6/2016 | Bennett |
| 9,400,749 B1 | 7/2016 | Kuzmin et al. |
| 10,108,366 B2 | 10/2018 | Huang et al. |
| 10,126,982 B1 | 11/2018 | Colgrove et al. |

(Continued)

FOREIGN PATENT DOCUMENTS

| | | |
|---|---|---|
| KR | 10-1366960 | 2/2014 |
| KR | 10-2015-0114958 | 10/2015 |

(Continued)

OTHER PUBLICATIONS

Office Action dated Nov. 13, 2020 for U.S. Appl. No. 16/599,870, filed Oct. 11, 2019 (14 pages).

(Continued)

*Primary Examiner* — Nanci N Wong

(74) *Attorney, Agent, or Firm* — Perkins Coie LLP

(57) ABSTRACT

A memory controller, a memory system including the memory controller and a method for operating the memory system are disclosed. The memory controller updates a reference parameter for a memory area in which at least part of the mapping information is stored and determines whether to activate the memory area based on the reference parameter to effectively execute commands received from a host.

20 Claims, 17 Drawing Sheets

(56) References Cited

U.S. PATENT DOCUMENTS

| | | | |
|---|---|---|---|
| 10,409,511 B1 | 9/2019 | Subbarao et al. | |
| 10,558,393 B2 | 2/2020 | Shin et al. | |
| 2008/0313405 A1 | 12/2008 | Sakata et al. | |
| 2009/0013149 A1 | 1/2009 | Uhlig et al. | |
| 2010/0185883 A1* | 7/2010 | Hamilton | G06F 8/4432 |
| | | | 713/320 |
| 2011/0219106 A1* | 9/2011 | Wright | G06F 3/067 |
| | | | 709/223 |
| 2011/0231623 A1 | 9/2011 | Goss et al. | |
| 2014/0052898 A1 | 2/2014 | Nan | |
| 2014/0089761 A1 | 3/2014 | Kwok | |
| 2014/0244897 A1 | 8/2014 | Goss et al. | |
| 2016/0246726 A1* | 8/2016 | Hahn | G06F 3/0679 |
| 2016/0259723 A1* | 9/2016 | Lee | G11C 16/26 |
| 2016/0299715 A1 | 10/2016 | Hashimoto et al. | |
| 2016/0342509 A1 | 11/2016 | Kotte et al. | |
| 2017/0039141 A1 | 2/2017 | Yeh et al. | |
| 2017/0083436 A1 | 3/2017 | Jung | |
| 2017/0192902 A1 | 7/2017 | Hwang et al. | |
| 2018/0004413 A1 | 1/2018 | Zhang | |
| 2018/0225176 A1 | 8/2018 | Kim et al. | |
| 2018/0275873 A1* | 9/2018 | Frid | G06F 12/0246 |
| 2018/0322042 A1 | 11/2018 | Jang | |
| 2019/0089383 A1* | 3/2019 | Funaoka | G06F 11/1048 |
| 2019/0102291 A1 | 4/2019 | Zhou | |
| 2019/0121540 A1 | 4/2019 | Shin et al. | |
| 2019/0227929 A1* | 7/2019 | Lin | G06F 3/0604 |
| 2019/0243773 A1 | 8/2019 | Li | |
| 2019/0258585 A1 | 8/2019 | Marcu et al. | |
| 2019/0266079 A1 | 8/2019 | R et al. | |
| 2019/0332542 A1* | 10/2019 | Li | G06F 3/0664 |
| 2019/0377647 A1* | 12/2019 | Rao | H04L 67/1095 |
| 2020/0004701 A1 | 1/2020 | Subbarao et al. | |
| 2020/0034307 A1 | 1/2020 | Duzly et al. | |
| 2020/0092194 A1* | 3/2020 | Tillotson | H04L 45/04 |
| 2020/0151108 A1 | 5/2020 | Yen et al. | |
| 2020/0210344 A1* | 7/2020 | Manganelli | G06F 12/0868 |
| 2020/0371908 A1 | 11/2020 | Cariello | |
| 2020/0409584 A1* | 12/2020 | Matsumoto | G06F 3/0653 |

FOREIGN PATENT DOCUMENTS

| | | |
|---|---|---|
| KR | 101631039 B1 | 6/2016 |
| KR | 10-2017-0002866 | 1/2017 |
| KR | 1020170005915 | 1/2017 |
| KR | 101736647 B1 | 5/2017 |
| KR | 101867487 B1 | 7/2018 |
| KR | 10-2020-0116704 A | 10/2020 |
| WO | 2014120698 | 8/2014 |

OTHER PUBLICATIONS

Non-Final Office Action dated Jun. 14, 2021 in U.S. Appl. No. 16/733,867, 37 pages.

* cited by examiner

MEMORY SYSTEM, MEMORY CONTROLLER AND METHOD FOR OPERATING MEMORY SYSTEM

CROSS-REFERENCE TO RELATED APPLICATION

This patent document claims the priority and benefits of Korean Patent Application No. 10-2019-0081023 filed on Jul. 5, 2019, which is incorporated herein by reference in its entirety.

TECHNICAL FIELD

Various embodiments generally relate to a memory system, a memory controller and a method for operating the memory system.

BACKGROUND

A memory system including one or more data storage devices that are used for storing and extracting data files. It can store data temporarily or persistently based on a request of a host, such as a computer, server, mobile device (e.g., smartphone, tablet), or any similar electronic devices. The examples of the memory system span from a traditional hard disk drive (HDD) to a semiconductor-based data storage that stores data in a nonvolatile memory, such as a solid state drive (SSD), a universal flash storage (UFS) device and an embedded MMC (eMMC) device.

The memory system may further include a memory controller for controlling such data storage devices. The memory controller may receive a command from the host to perform read and write operations on the data storage devices such as memory devices included in the memory system.

SUMMARY

The technology disclosed in this patent document can be implemented in various embodiments to provide a memory system, a memory controller and a method that can effectively execute commands received from a host.

Some embodiments of the disclosed technology relate to a memory system, a memory controller and a method for operating the memory system that enable a host to quickly refer to necessary mapping information.

In one aspect, embodiments of the disclosed technology may provide a memory system including: a memory system including a memory device which stores mapping information between logical addresses and physical addresses and a memory controller in communication with the memory device to control the memory device.

The memory controller may store at least part of the mapping information in a memory area outside the memory system.

The memory controller may update a reference parameter for the at least part of the mapping information stored in the memory area.

The memory controller may determine whether to activate the memory area to store the mapping information in the memory area, based on the reference parameter.

The memory controller may update the reference parameter, based on workload information associated with a command received from a host.

For example, the workload information may be determined based on a read command received from the host for a predetermined time period or a write command received from the host for a predetermined time period.

For another example, the workload information may be determined based on a pattern of logical addresses corresponding to one or more commands received from the host for a predetermined time period.

For still another example, the workload information may be determined based on a frequency of referring to the memory area responsive to commands received from the host for a predetermined time period.

When the memory area is in a deactivated state, the memory controller may update the reference parameter based on whether a logical address included in a command received from the host matches a logical address included in mapping information stored in a virtual memory area positioned in the memory controller.

In another aspect, embodiments of the disclosed technology may provide a memory controller including: a memory interface for communicating with a memory device which configured to store mapping information between logical addresses and physical addresses and a control circuit for controlling the memory device.

The control circuit may store at least part of the mapping information in a memory area outside the memory controller.

The control circuit may update a reference parameter for the at least part of the mapping information stored in the memory area.

The control circuit may determine whether to activate the memory area to store the mapping information in the memory area, based on the reference parameter.

The control circuit may update the reference parameter, based on workload information associated with a command received from a host.

For example, the workload information may be determined based on a read command received from the host for a predetermined time period or a write command received from the host for a predetermined time period.

For another example, the workload information may be determined based on a pattern of logical addresses corresponding to one or more commands received from the host for a predetermined time period.

For still another example, the workload information may be determined based on a frequency of referring to the memory area responsive to commands received from the host for a predetermined time period.

When the memory area is in a deactivated state, the control circuit may update the reference parameter based on whether a logical address included in a command received from the host matches a logical address included in mapping information stored in a virtual memory area positioned in the memory controller.

In still another aspect, embodiments of the disclosed technology may provide a method for operating a memory system, including: updating, by a first device included in the memory system, a reference parameter associated with a memory area in which at least part of mapping information for mapping between logical addresses and physical addresses is stored, and determining, by the first device, whether to activate the memory area, based on the reference parameter.

The second device, different from the first device, may include the memory area.

The first device may include a memory controller included in the memory system, and the second device may include a host configured to transmit a command to the memory controller.

The updating of the reference parameter by the first device may update the reference parameter, based on workload information on a command received from the host.

For example, the workload information may be determined based on a read command received from the host for a predetermined time period or a write command received from the host for a predetermined time period.

For another example, the workload information may be determined based on a pattern of logical addresses corresponding to one or more commands received from the host for a predetermined time period.

For still another example, the workload information may be determined based on a frequency of referring to the memory area responsive to commands received from the host for a predetermined time period.

In some embodiments of the disclosed technology, a memory system includes a memory device which stores mapping information between logical addresses and physical addresses and a memory controller which controls the memory device, wherein the memory controller stores all or part of the mapping information in a memory area outside the memory system, dynamically updates a reference parameter for all or some of the mapping information stored in the memory area, based on workload information on a command received from a host, and determines whether to activate the memory area, based on the reference parameter.

In some embodiments of the disclosed technology, a memory controller includes a memory interface for communicating with a memory device which stores mapping information between logical addresses and physical addresses and a control circuit for controlling the memory device, wherein the control circuit stores all or some of the mapping information in a memory area outside the memory controller, dynamically updates a reference parameter for all or some of the mapping information stored in the memory area, based on workload information on a command received from a host, and determines whether to activate the memory area, based on the reference parameter.

In some embodiments of the disclosed technology, a method for operating a memory system includes dynamically updating a reference parameter on a memory area in which all or some of mapping information between logical addresses and physical addresses are stored, by a first device included in the memory system, based on workload information on a command received from a second device different from the first device, and determining, by the first device, whether to activate the memory area, based on the reference parameter, wherein the memory area is positioned in the second device.

According to the embodiments of the disclosed technology, it is possible to provide a memory system, a memory controller and a method for operating the memory system, capable of quickly processing a command received from a host.

Also, according to the embodiments of the disclosed technology, it is possible to provide a memory system, a memory controller and a method for operating the memory system, capable of allowing a host to quickly refer to necessary mapping information.

DETAILED DESCRIPTION

Hereinafter, a memory system, a memory controller and a method for operating the memory system will be described below in detail with reference to the accompanying drawings through various examples of embodiments of the disclosed technology.

Figure 1:
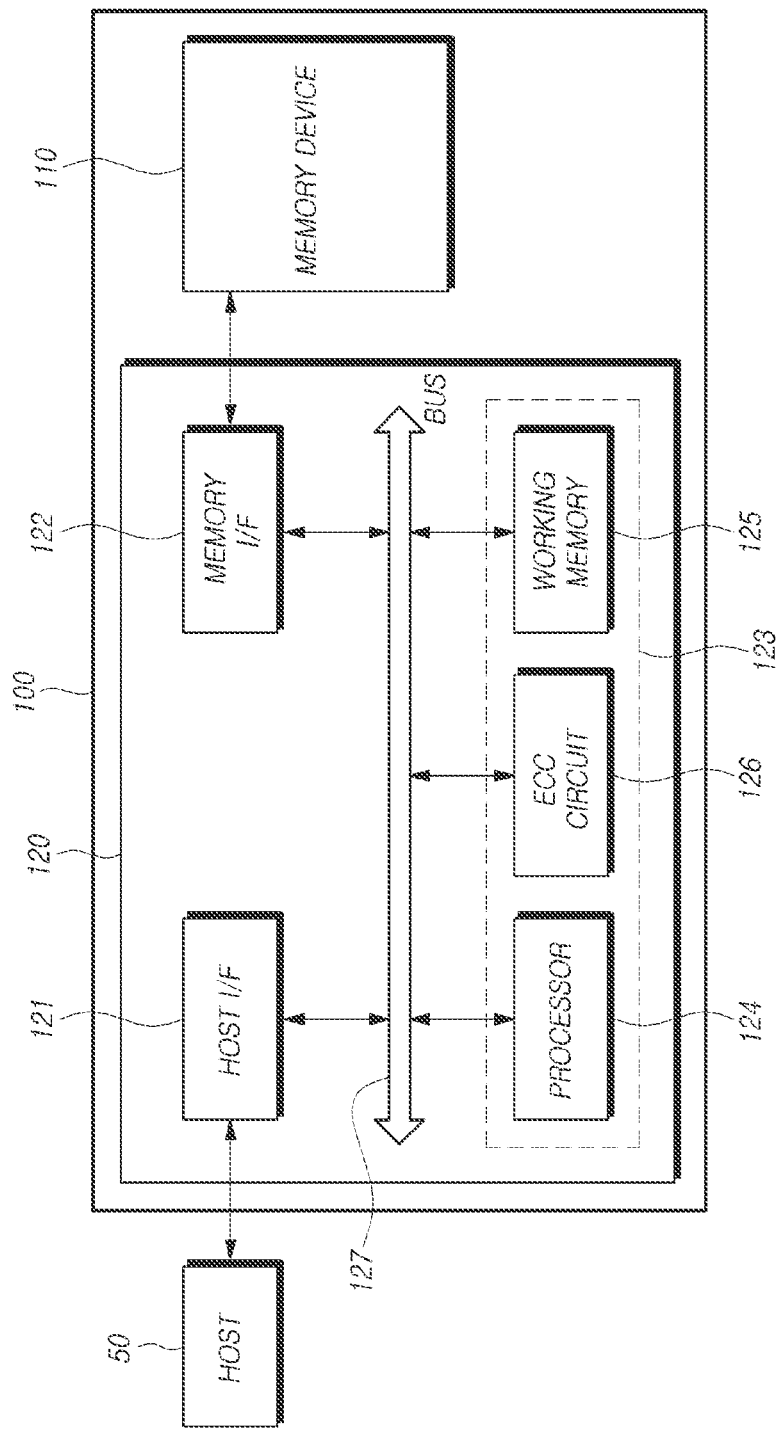
FIG. 1 is a block diagram schematically illustrating an example of a memory system based on some embodiments of the disclosed technology.

FIG. 1 is a block diagram schematically illustrating an example of a memory system 100 based on some embodiments of the disclosed technology.

In an implementation, the memory system 100 the disclosed technology may include a memory device 110, which stores data, and a memory controller 120, which controls the memory device 110.

The memory device 110 includes a memory cell array, and the memory controller 120 performs memory operations on the memory cell array. Examples of such memory operations may include, for example, a read operation, a program operation (also referred to as a write operation) and an erase operation.

The memory cell array includes a plurality of memory cells for storing data. In some implementations, a predetermined number of memory cells constitute a memory block, and a plurality of memory blocks constitute the memory cell array.

In some implementations, the memory device 110 may include a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM) or a spin transfer torque random access memory (STT-RAM).

The memory device 110 may have a three-dimensional array structure. In an implementation, the memory device 110 may be a flash memory using the disclosed technology conductive floating gate as a charge storage layer. In another implementation, the memory device 110 may be a charge trap flash (CTF) using a dielectric layer as the charge storage layer.

The memory device 110 is configured to receive a command and an address from the memory controller 120 and access a region in the memory cell array which is selected by the address. In other words, the memory device 110 may perform an operation requested by the command, and perform the operation for a region selected by the address.

In an implementation, the memory device 110 may include non-volatile memory devices such as flash memory devices, and can be operated to perform a program operation, a read operation and an erase operation. In the program operation, the memory device 110 may be operated to write data in a region of the memory cell array selected by the address. In the read operation, the memory device 110 may read data from a region of the memory cell array selected by the address. In the erase operation, the memory device 110 may erase data stored in a region of the memory cell array selected by the address.

The memory controller 120 may control the operation of the memory device 110 according to a request of a host 50 or regardless of a request of the host 50.

For example, the memory controller 120 may control write (program), read, erase and background operations for the memory device 110. For example, the background operation may include a garbage collection (GC) operation, a wear leveling (WL) operation, a bad block management (BBM) operation, or the like.

In some implementations, the memory controller 120 may include a host interface 121, a memory interface 122, and a control circuit 123.

The host interface 121 provides an interface for communication with the host 50. The control circuit 123 may receive a command from the host 50 through the host interface 121 and control execution of the received command.

The memory interface 122 provides an interface for communication with the memory device 110. In some implementations, the memory interface 122 may be configured to provide the interface between the memory device 110 and the memory controller 120 in performing memory operations based on internal control signals of the control circuit 123.

The control circuit 123 performs the general control operations of the memory controller 120, thereby controlling the operations of the memory device 110. In an implementation, the control circuit 123 may include at least one of a processor 124 and a working memory 125. In another implementation, the control circuit 123 may further include an error detection and correction circuit (ECC circuit) 126.

The processor 124 may control general operations of the memory controller 120, and may perform a logic calculation. The processor 124 may communicate with the host 50 through the host interface 121, and may communicate with the memory device 110 through the memory interface 122.

The processor 124 may perform the function of a flash translation layer (FTL). The processor 124 may translate a logical block address (LBA) provided by the host 50, into a physical block address (PBA), through the flash translation layer (FTL). The flash translation layer (FTL) may receive the logical block address (LBA) and translate the received logical block address (LBA) into the physical block address (PBA), by using a mapping table. There are various address mapping methods of the flash translation layer, depending on a mapping unit. Representative address mapping methods include a page mapping method, a block mapping method and a hybrid mapping method.

In some implementations, the processor 124 is configured to randomize data received from the host 50. For example, the processor 124 may randomize data received from the host 50, by using a randomizing seed. Randomized data as data to be stored is provided to the memory device 110 and is programmed to the memory cell array.

In some implementations, the processor 124 is configured to derandomize data received from the memory device 110, in a read operation. For example, the processor 124 may derandomize data received from the memory device 110, by using a derandomizing seed. Derandomized data may be outputted to the host 50.

In some implementations, the processor 124 may control the operation of the memory controller 120 by executing firmware operations. In order to control general operations of the memory controller 120 and perform a logic calculation, firmware is loaded to the working memory 125 upon booting, and the processor 124 executes the firmware operations. For instance, the firmware may be stored in the memory device 110 and be loaded to the working memory 125.

In some implementations, the firmware is software that is installed on a memory to provide a control for the memory system 100. Examples of the firmware associated with the memory system 100 include a flash translation layer (FTL), which performs a converting function between a logical address requested to the memory system 100 from the host 50 and a physical address of the memory device 110, a host interface layer (HIL), which is operated to analyze a command requested to the memory system 100 from the host 50 and transfers the command to the flash translation layer (FTL), and a flash interface layer (FM), which transfers a command instructed from the flash translation layer (FTL) to the memory device 110.

The working memory 125 may store firmware files, program codes, commands and dedicated to performing the operations of the memory controller 120.

In some implementations, the working memory 125, for example, as a volatile memory, may include at least one of an SRAM (static RAM), a DRAM (dynamic RAM), or an SDRAM (synchronous DRAM).

The error detection and correction circuit 126 may be configured to detect and correct one or more erroneous bits in the data stored in the working memory 125 (e.g., read data transferred from the memory device 110) by using an error detection code and error correction code.

The error detection and correction circuit 126 may be realized to decode data by using an error correction code. The error detection and correction circuit 126 may be realized by various decoding schemes. For example, at least one of unsystematic code decoding schemes or systematic code decoding schemes may be used.

In some implementations, the error detection and correction circuit 126 may detect one or more erroneous data bits on a sector basis. In some implementations, program (write) operations and read operations are performed on a page basis, and erase operations are performed on a block basis. The sector, page, and block are units of memory space, and the sector is a smaller unit compared to the page.

In some implementations, the error detection and correction circuit 126 may calculate a bit error rate (BER), and may determine whether an error is correctable or not on a sector basis. For example, in the case where a bit error rate (BER) is higher than a predetermined threshold value, the error detection and correction circuit 126 may determine whether the corresponding sector is correctable or not. On the other hand, in the case where a bit error rate (BER) is lower than the reference value, the error detection and correction circuit 126 may determine that a corresponding sector is correctable.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, the error detection and correction circuit 126 may detect an uncorrectable sector. The error detection and correction circuit 126 may sends, to the processor 124, the information associated with the location of erroneous data bits and whether or not they can be corrected (e.g., address of uncorrectable sector.

A bus 127 may be configured to provide channels between the components 121, 122, 124, 125 and 126 of the memory controller 120. The bus 127 may include, for example, a control bus for carrying control signals such as commands, and a data bus for carrying data.

The above-described components 121, 122, 124, 125 and 126 of the memory controller 120 are only examples to facilitate an understanding of the disclosed technology. The components 121, 122, 124, 125 and 126 may be selectively included in the memory controller 120 or part of the components 121, 122, 124, 125 and 126 may be omitted.

Figure 2:
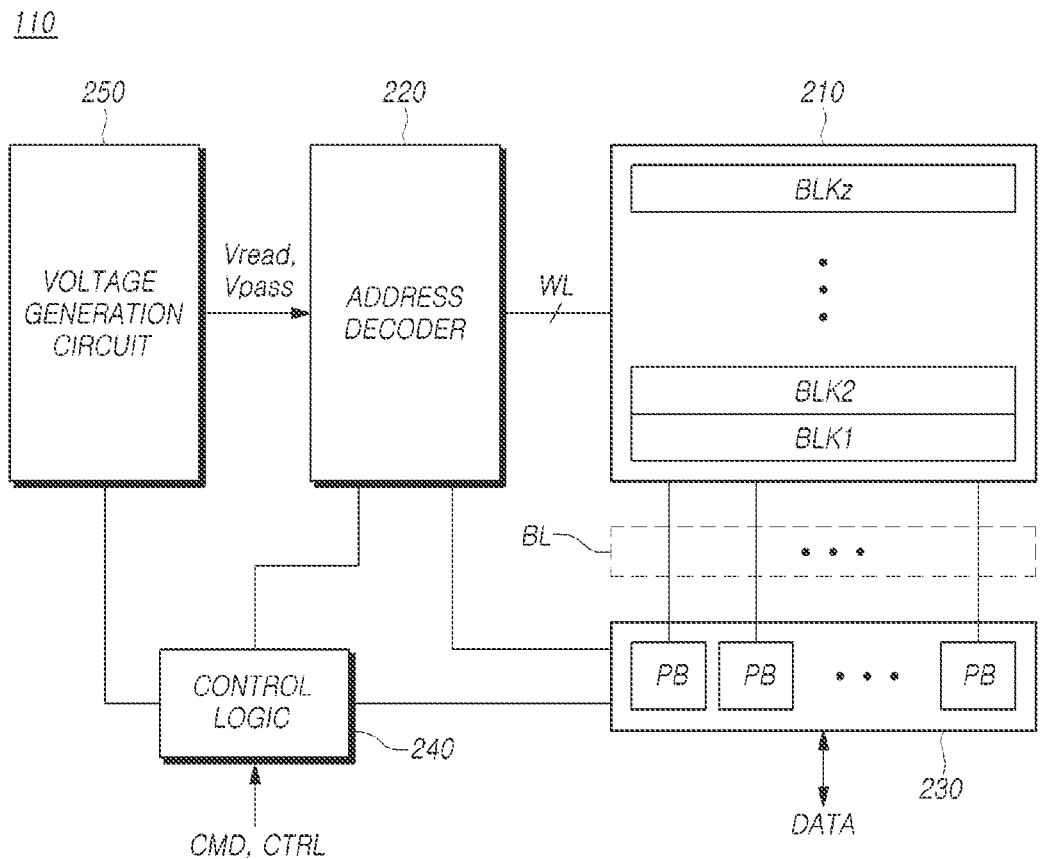
FIG. 2 is a block diagram schematically illustrating an example of a memory device based on some embodiments of the disclosed technology.

FIG. 2 is a block diagram schematically illustrating an example of the memory device 110 based on some embodiments of the disclosed technology.

In some implementations, the memory device 110 may include a memory cell array 210, an address decoder 220, a read and write circuit 230, a control logic 240, and a voltage generation circuit 250.

The memory cell array 210 may include a plurality of memory blocks BLK1 to BLKz (z is a natural number of 2 or greater).

In the plurality of memory blocks BLK1 to BLKz, a plurality of memory cells (MC), a plurality of word lines WL and a plurality of bit lines BL may be arranged in rows and columns.

The plurality of memory blocks BLK1 to BLKz may be coupled to the address decoder 220 through the plurality of word lines WL. The plurality of memory blocks BLK1 to BLKz may be coupled to the read and write circuit 230 through the plurality of bit lines BL.

Each of the plurality of memory blocks BLK1 to BLKz may include a plurality of memory cells. For example, the plurality of memory cells may be nonvolatile memory cells. In some implementations, such nonvolatile memory cells may have vertical channel structures.

The memory cell array 210 may be configured by a memory cell array of a two-dimensional structure, or as the case may be, may be configured by a memory cell array of a three-dimensional structure.

Each of the plurality of memory cells included in the memory cell array may store at least one bit of data. For instance, each of the plurality of memory cells included in the memory cell array 210 may be a single level cell (SLC) storing one bit of data per cell. Each of the plurality of memory cells included in the memory cell array 210 may be a multi-level cell (MLC) which stores two bits of data per cell. Each of the plurality of memory cells included in the memory cell array 210 may be a triple level cell (TLC) which stores three bits of data per cell. Each of the plurality of memory cells included in the memory cell array 210 may be a quad level cell (QLC) which stores 4-bit data. The memory cell array 210 may include a plurality of memory cells, each of which stores 5 or more-bit data.

The address decoder 220, the read and write circuit 230, the control logic 240 and the voltage generation circuit 250 may operate as peripheral circuits that are used to control read, write, and/or erase operations of the memory cell array 210.

The address decoder 220 may be coupled to the memory cell array 210 through the plurality of word lines WL.

The address decoder 220 may be operated to select one or more of the word lines WL based on the address based on control signals of the control logic 240.

The address decoder 220 may receive an address through an input/output buffer (not shown) in the memory device 110. The address decoder 220 may be configured to decode the received address to obtain a block address. The address decoder 220 may select at least one memory block based on the decoded block address.

The address decoder 220 may receive a read voltage Vread and a pass voltage Vpass from the voltage generation circuit 250.

The address decoder 220 may apply the read voltage Vread to a selected word line WL in a selected memory block in a read voltage applying operation during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode the received address to obtain a column address. The address decoder 220 may provide the decoded column address to the read and write circuit 230.

A read operation and a program operation of the memory device 110 may be performed on a page basis. When a read operation or a program operation is requested, address signals are provided and decoded to obtain a block address, a row address, and/or a column address.

The address decoder 220 may select one memory block and one word line based on a block address and a row address. A column address may be obtained from the address decoder 220 and be provided to the read and write circuit 230.

The address decoder 220 may include at least one of a block decoder, a row decoder, a column decoder, or an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may include a page buffer circuit or a data register circuit. For example, the data register circuit may include a data buffer for holding data, and may further include a cache buffer for performing a caching function.

The plurality of page buffers PB may be coupled to the memory cell array 210 through the plurality of bit lines BL. The plurality of page buffers PB may continuously supply sensing current to bit lines coupled to memory cells to sense threshold voltages (Vth) of the memory cells for a read operation and a program verify operation, and may latch sensing data by sensing, through sensing nodes, changes in the current flowing through a selected bit line that varies depending on the programmed states of the corresponding memory cells. The read and write circuit 230 may operate based on page buffer control signals provided by the control logic 240.

In a read operation, the read and write circuit 230 temporarily stores read data by sensing the threshold voltages (Vth) of memory cells, and outputs data DATA to the input/output buffer of the memory device 110. In an embodiment, the read and write circuit 230 may include a column select circuit in addition to the page buffers (or page registers).

The control logic 240 may be in communication with the address decoder 220, the read and write circuit 230 and the voltage generation circuit 250. The control logic 240 may receive a command CMD and a control signal CTRL through the input/output buffer of the memory device 110.

The control logic 240 may be configured to control general operations of the memory device 110 in response to the control signal CTRL. Further, the control logic 240 may output a control signal for adjusting the precharge potential levels of the sensing nodes of the plurality of page buffers PB.

The control logic 240 may control the read and write circuit 230 to perform a read operation of the memory cell array 210.

The voltage generation circuit 250 may generate the read voltage Vread and the pass voltage Vpass in a read operation in response to a voltage generation circuit control signal outputted from the control logic 240.

Figure 3:
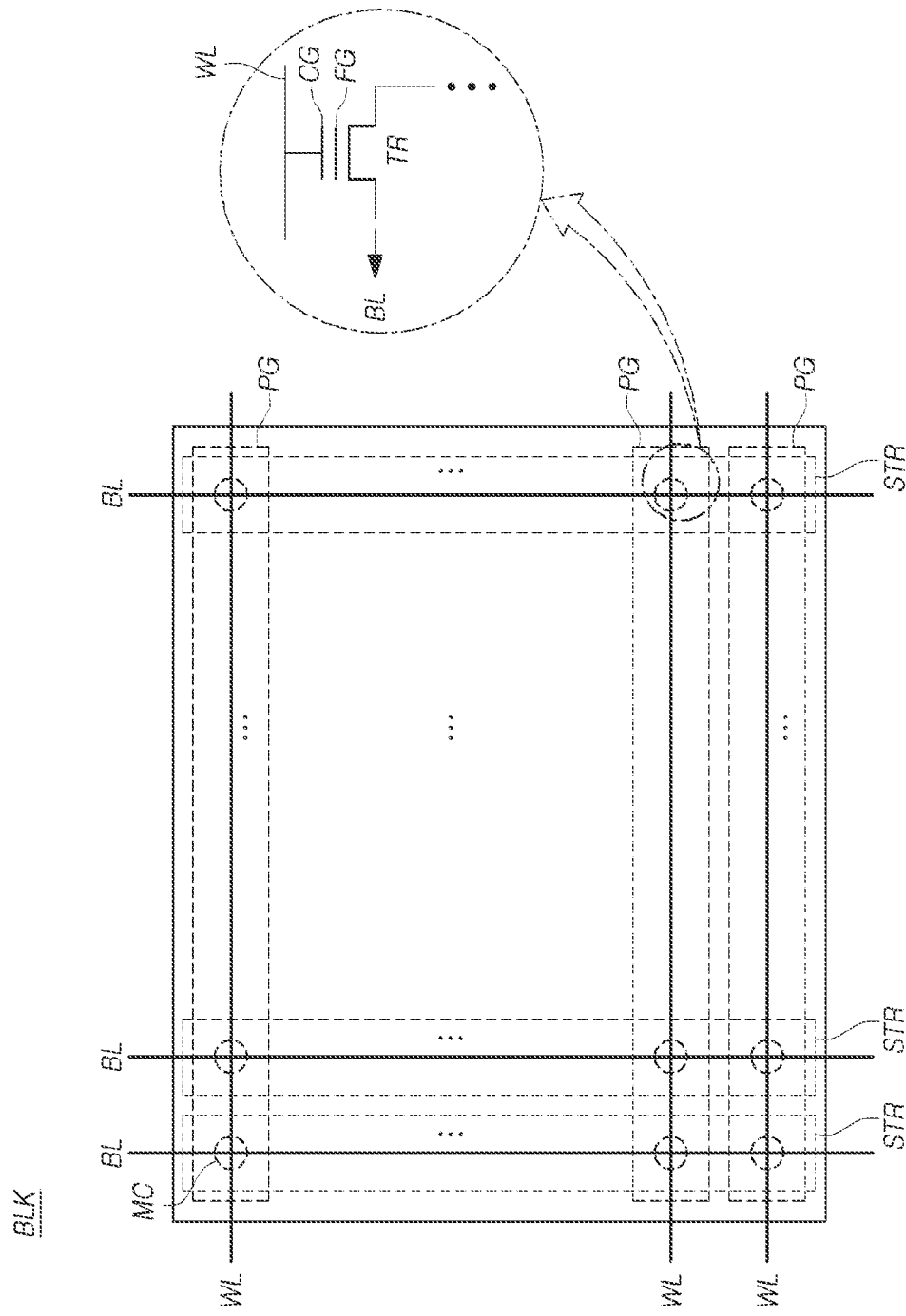
FIG. 3 is a diagram schematically illustrating an example of a memory block of the memory device based on some embodiments of the disclosed technology.

FIG. 3 is a diagram schematically illustrating an example of one of the plurality of memory blocks BLK1 to BLKz of the memory device 110 based on some embodiments of the disclosed technology.

In an implementation where the memory device 110 is a NAND flash memory NAND flash cells are joined together in strings and arrays to form larger data storage structures. A predetermined number of strings are joined together to form the memory block BLK included in the memory device 110. A word line connects to all memory cells in the same position in the strings and defines a page PG within the memory block. In some implementations, where a plurality of pages PG are arranged in rows, a plurality of strings STR are arranged in columns.

In some implementations, the plurality of pages PG are coupled to a plurality of word lines WL, respectively, and the plurality of strings STR in the array are connected at one end to a common source line and at the other end to each of a plurality of bit lines BL.

In the memory block BLK, the plurality of word lines WL and the plurality of bit lines BL may be arranged in rows and columns. For example, each of the plurality of word lines WL may be disposed in a row (or column) direction, and each of the plurality of bit lines BL may be disposed in a column (or row) direction.

In some implementations where the memory block BLK is a memory block of a NAND flash memory, memory cells MC in a memory cell string are coupled to the plurality of word lines WL, respectively, and the memory cell string is coupled, at one end, to one of the plurality of bit lines BL. Each memory cell MC may include a transistor TR for storing data.

In some implementations, the transistor TR disposed in each memory cell MC may include a drain, a source and a gate. The drain (or source) of the transistor TR may be coupled with a corresponding bit line BL directly or via another transistor TR, and the source (or drain) of the transistor TR may be coupled with a source line (which may be the ground) directly or via another transistor TR. The gate of the transistor TR may include a floating gate FG surrounded by a dielectric and a control gate CG to which a gate voltage is applied from a word line WL.

When the memory device 110 has a memory block structure as illustrated in FIG. 3, a read operation and a program operation (write operation) may be performed on a page basis, and an erase operation may be performed on a memory block basis.

In the memory block BLK, a first select line (not shown) such as a source select line (or a drain select line) may be coupled between one end of the string STR and the read and write circuit 230, and a second select line (not shown) such as a drain select line (or a source select line) may be coupled between the other end of the string STR and the read and write circuit 230.

In some implementations, at least one dummy word line may be additionally disposed between the first outermost word line and the first select line. At least one dummy word line may also be additionally disposed between the second outermost word line and the second select line.

Figure 4:
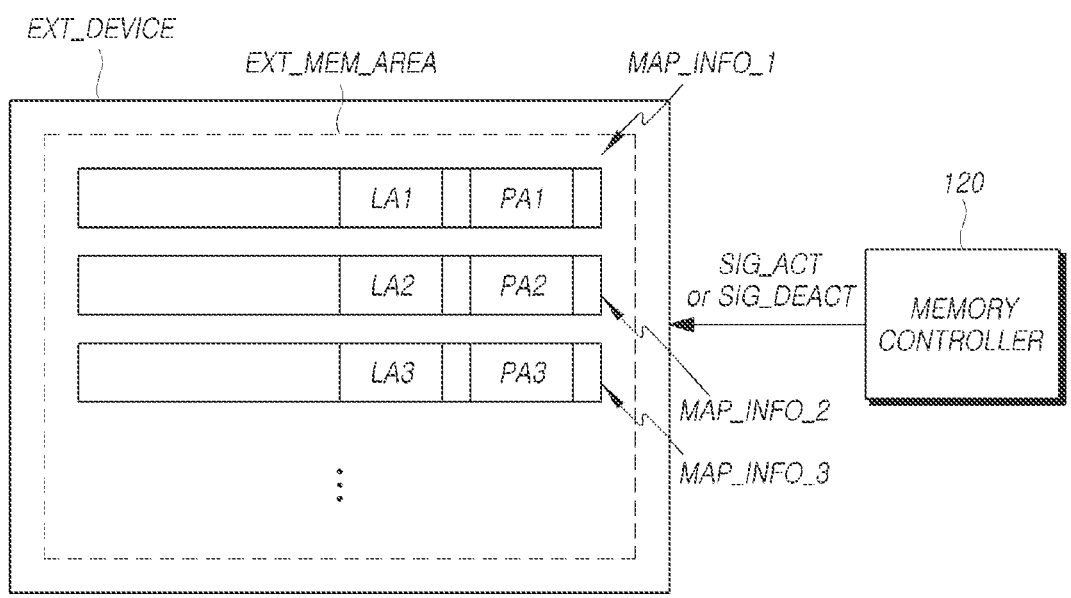
FIG. 4 is a diagram schematically illustrating an example operation of a memory controller based on some embodiments of the disclosed technology.

FIG. 4 is a diagram schematically illustrating an example operation of the memory controller 120 based on some embodiments of the disclosed technology.

In some implementations, the memory controller 120 may store mapping information for mapping between logical addresses and physical addresses in a memory area EXT_MEM_AREA. In one example, the memory controller 120 includes the memory area EXT_MEM_AREA. In another example, the memory area EXT_MEM_AREA is outside the memory controller 120.

In some implementations, upon receipt a logical address from the host 50, the memory system 100 translates the logical address to a physical address at which data is stored in the memory device 110. A physical address may include at least one of die information, plane information, memory block information, or page information. Mapping information between a logical address and a physical address may be used to map each logical address to a physical address, and such logical and physical addresses may include logical and physical page addresses, logical and physical sector addresses, and logical and physical block address.

The memory device 110 may store the mapping information for mapping between the logical address and the physical address. For example, the memory device 110 may store the mapping information in a mapping table.

The memory controller 120 may load all or some of mapping information and cache the mapping information in the working memory 125 of the memory controller 120.

The memory area EXT_MEM_AREA described above may include mapping information MAP_INFO_1, MAP_INFO_2 and MAP_INFO_3. The mapping information may include a logical address, a physical address associated with the logical address, and may also be referred to as map data or a map data segment.

The memory area EXT_MEM_AREA may be positioned outside the memory system 100. Specifically, the memory area EXT_MEM_AREA may be positioned in an external device EXT_DEVICE of the memory controller 120.

Example of the external device EXT_DEVICE may include an SRAM, a DRAM, an SDRAM and a NAND flash memory included in the host 50. For another example, the external device EXT_DEVICE may be a separate storage device positioned outside the host 50.

Referring to FIG. 4, first mapping information MAP_INFO_1 may include mapping information between a first logical address LA1 and a first physical address PA1. Second mapping information MAP_INFO_2 may include mapping information between a second logical address LA2 and a second physical address PA2. Third mapping information MAP_INFO_3 may include mapping information between a third logical address LA3 and a third physical address PA3.

The memory controller 120 may activate the memory area EXT_MEM_AREA to use the memory area EXT_MEM_AREA as a cache memory for mapping information which can be accessed directly by an external device. For example, the memory controller 120 may generate an activation signal SIG_ACT when the memory controller 120 intends to activate the memory area EXT_MEM_AREA, and conversely, may generate a deactivation signal SIG_DEACT when the memory controller 120 intends to deactivate the memory area EXT_MEM_AREA. For instance, each of the activation signal SIG_ACT and the deactivation signal SIG_DEACT may be a command signal to be transmitted to the host 50. The external device EXT_DEVICE in which the memory area EXT_MEM_AREA is positioned may receive the activation signal SIG_ACT or the deactivation signal SIG_DEACT, and thereby may control an operation for actually activating/deactivating the corresponding memory area EXT_MEM_AREA.

If the memory area EXT_MEM_AREA is activated by the memory controller 120, an external device such as the host 50 may directly refer to the mapping information stored in the memory area EXT_MEM_AREA. That is to say, the device such as the host 50 may refer to the mapping information stored in the activated memory area EXT_MEM_AREA, and may include both the logical address and the value of the physical address corresponding to the logical address, in the command signal to be transmitted to the memory controller 120.

On the other hand, if the memory area EXT_MEM_AREA is deactivated by the memory controller 120, the host 50 does not refer to the mapping information stored in the memory area EXT_MEM_AREA.

In this way, the memory controller 120 selectively activate or deactivate the memory area EXT_MEM_AREA.

If the mapping information stored in the memory area EXT_MEM_AREA is referred to by the host 50, upon receiving a command transmitted from the host 50, the memory controller 120 may use a physical address included in the corresponding command, without the need for separately searching for the physical address mapped to a logical address included in the corresponding command. Therefore, if the mapping information stored in the memory area EXT_MEM_AREA is highly likely to be referred to by the host 50, it is advantageous in terms of performance to activate the memory area EXT_MEM_AREA.

On the other hand, in the case where the mapping information stored in the memory area EXT_MEM_AREA is less likely to be referred to by the host 50, keeping the memory area EXT_MEM_AREA in an activated state may rather increase an overhead to the system, thereby deteriorating the performance of the memory system.

For example, when the memory controller 120 performs an operation of controlling the mapping information to be stored in the memory area EXT_MEM_AREA, the overhead to the system may increase. Further, if the memory area EXT_MEM_AREA is activated, the host 50 first searches mapping information in the memory area EXT_MEM_AREA before transmitting a command to the memory controller 120, and in this process, an overhead may additionally increase.

In the case where the host 50 fails to search for, in the memory area EXT_MEM_AREA, a physical address mapped to a logical address included in a command, the memory controller 120 needs to search again for, in a mapping table, the physical address mapped to the corresponding logical address, as in a general FTL operation, and thus, a total time for searching mapping information rather increases.

Therefore, in order for the memory controller 120 to quickly execute a command instructed by the host 50, the memory controller 120 implemented based on some embodiments of the disclosed technology can selectively activate or deactivate the memory area EXT_MEM_AREA.

If the memory controller 120 activates or deactivates the memory area EXT_MEM_AREA as described above, the host 50 may differently generate a command to be transmitted to the memory controller 120, based on whether the memory area EXT_MEM_AREA is activated or not.

As will be discussed below, the host 50 generates a command to be transmitted to the memory controller 120 based on whether the memory area EXT_MEM_AREA in the external device EXT_DEVICE is activated or deactivated.

Figure 5:
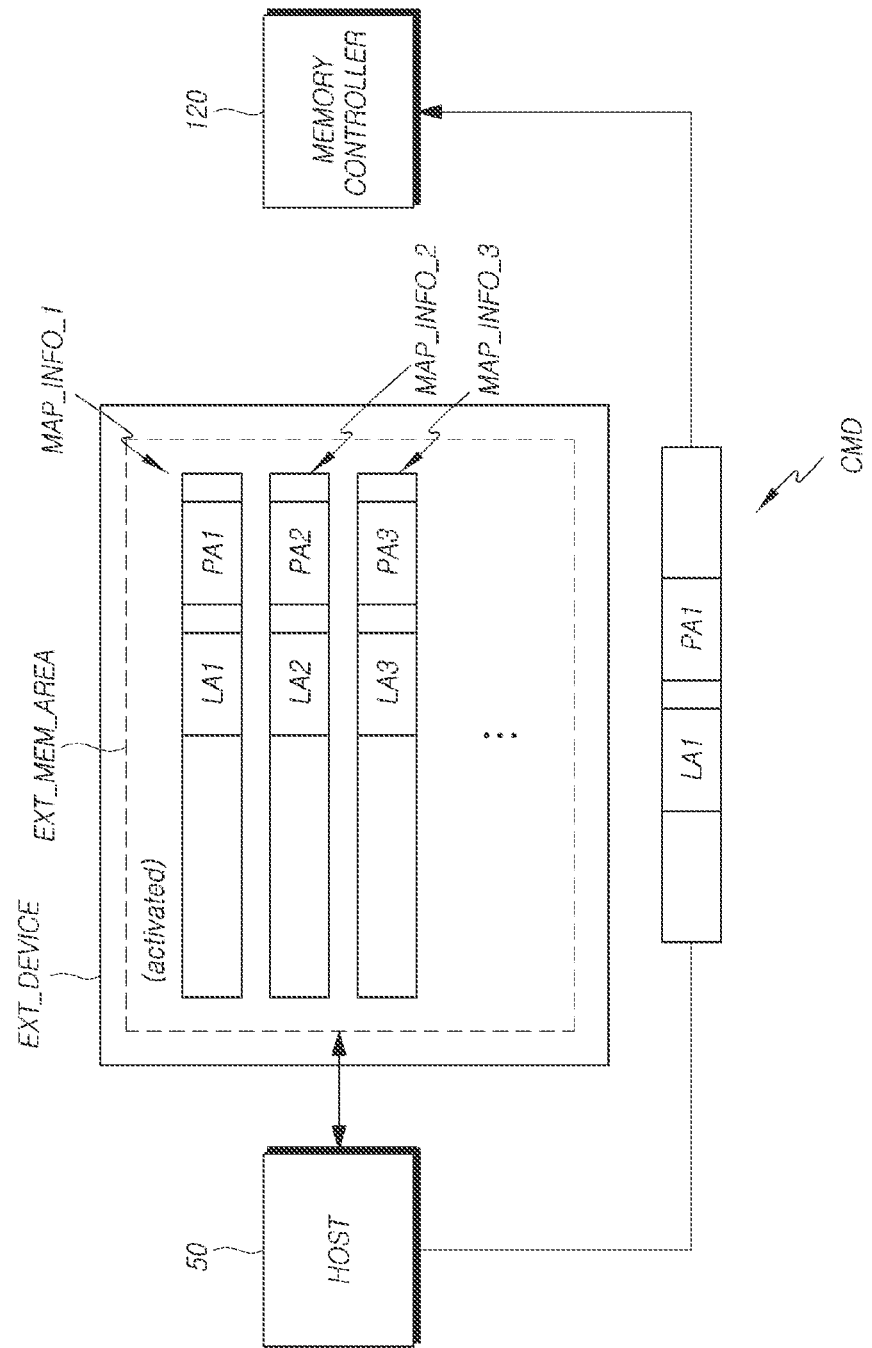
FIG. 5 is a diagram illustrating an example operation of a host and the memory controller in the case where a memory area the disclosed technology is activated.

FIG. 5 is a diagram illustrating an example operation of the host 50 and the memory controller 120 in the case where the memory area EXT_MEM_AREA the disclosed technology is activated.

FIG. 5 illustrates, as an example, a case where the host 50 transmits a command CMD for performing an operation (e.g., a read operation/a write operation) for the first logical address LA1, to the memory controller 120.

The host 50 may search for mapping information corresponding to the first logical address LA1 in the mapping information included in the activated memory area EXT_MEM_AREA, and may check the first physical address PA1 corresponding to the first logical address LA1, in the first mapping information MAP_INFO_1 corresponding to the first logical address LA1.

When transmitting the command CMD for performing the operation for the first logical address LA1, to the memory controller 120, the host 50 may include the first logical address LA1 and the first physical address PA1 checked in the memory area EXT_MEM_AREA, in the command CMD.

When the memory controller 120 receives the command CMD from the host 50, the memory controller 120 may determine the value of the first physical address PA1 included in the received command CMD, as a target physical address for which the operation indicated by the corresponding command CMD is to be performed. In this case, the memory controller 120 does not need to search mapping information stored in the memory device 110 or search mapping information cached in the working memory 125 of the memory controller 120, to determine a target physical address so that the operation indicated by the corresponding command CMD is performed on a memory cell corresponding to the target physical address. Therefore, the memory controller 120 may quickly process the command CMD received from the host 50.

However, there may be a case where the value of the first physical address PA1 included in the command CMD received from the host 50 does not match actual mapping information. For example, after the memory controller 120 loads mapping information on the first logical address LA1 to the memory area EXT_MEM_AREA, a physical address mapped to the first logical address LA1 by a background operation (e.g., garbage collection/wear leveling) may have a different value from the first physical address PA1.

Therefore, instead of using the value of the first physical address PA1 included in the corresponding command CMD as it is, the memory controller 120 may check whether the first logical address LA1 is actually mapped to the first physical address PA1 to use the first physical address PA1 included in the corresponding command CMD, only when the mapping is correct. If the first logical address LA1 is not mapped to the first physical address PA1, the memory controller 120 may search for another physical address the first logical address LA1 is actually mapped to, from the mapping information stored in the memory device 110 or the mapping information cached in the working memory 125 of the memory controller 120.

In the above, mapping information on the first logical address LA1 corresponding to the operation instructed by the command CMD is included in the memory area EXT_MEM_AREA. However, in some cases, mapping information on a logical address corresponding to the operation instructed by the command CMD is not in the memory area EXT_MEM_AREA. In this case, the command CMD includes only the value of the logical address corresponding to the operation instructed by the command CMD, and does not include the value of a physical address mapped to the corresponding logical address.

Figure 6:
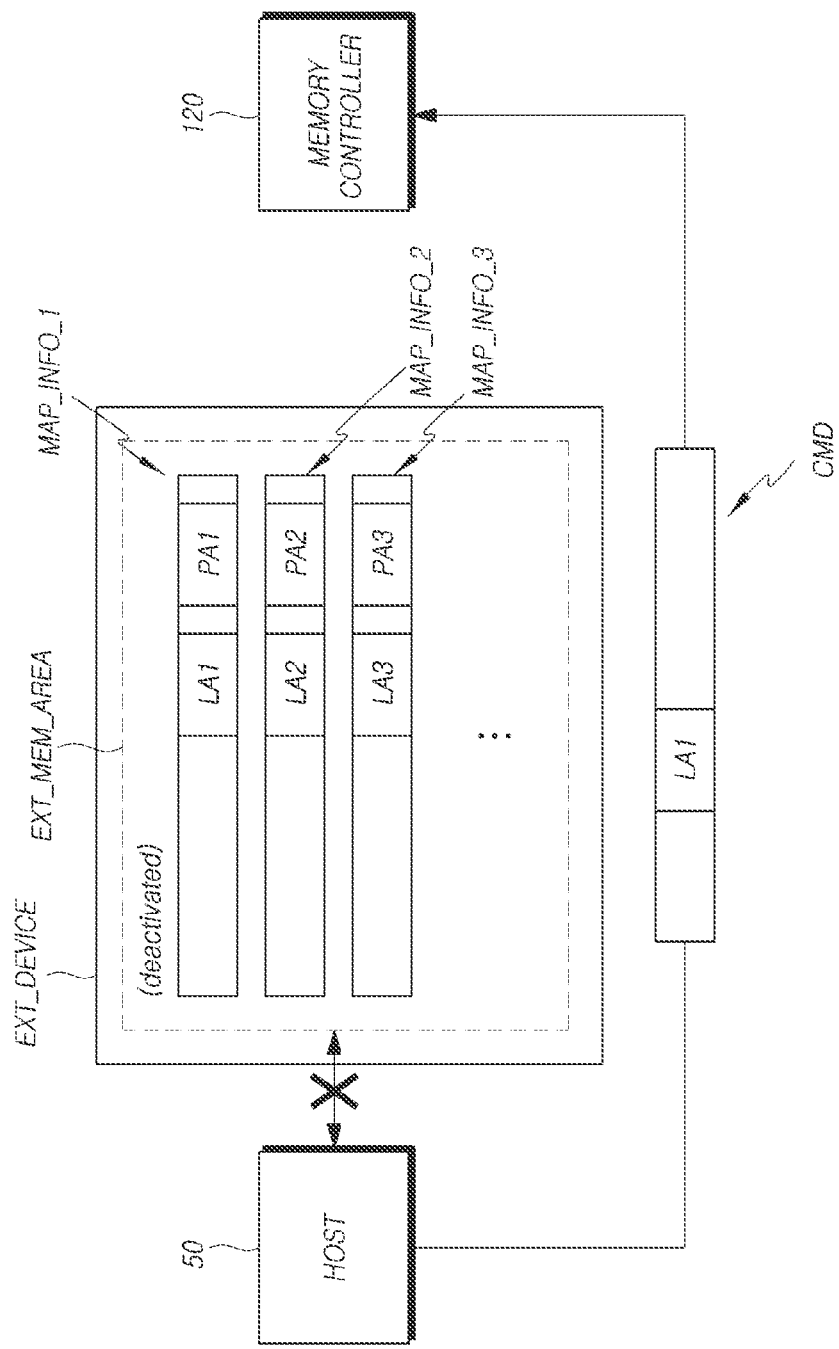
FIG. 6 is a diagram illustrating an example of operations of the host and the memory controller in the case where the memory area the disclosed technology is deactivated.

FIG. 6 is a diagram illustrating an example of operations of the host 50 and the memory controller 120 in the case where the memory area EXT_MEM_AREA is deactivated.

In one example, the host 50 transmits, to the memory controller 120, a command CMD for performing an operation (e.g., a read operation/a write operation) on the first logical address LA1.

Unlike the example shown in FIG. 5, since the memory area EXT_MEM_AREA is in a deactivated state, the host 50 does not refer to mapping information included in the memory area EXT_MEM_AREA. Thus, the host 50 includes in the command CMD the value of the first logical address LA1 corresponding to the operation instructed by the command CMD, but does not include in the command CMD the value of a physical address mapped to the first logical address LA1.

When the memory controller 120 receives the command CMD from the host 50, the memory controller 120 needs to search for the value of a physical address mapped to the first logical address LA1 included in the corresponding command CMD, in a manner similar to a general FTL operation method. For example, the memory controller 120 may search for a physical address which is actually mapped to the first logical address LA1, from the mapping information stored in the memory device 110 or the mapping information cached in the working memory 125 of the memory controller 120.

As shown in FIGS. 4 to 6, the operations of the host 50 and the memory controller 120 vary depending on whether the memory area EXT_MEM_AREA is activated. As will be discussed below, the memory controller 120 can determine whether to activate the memory area EXT_MEM_AREA.

Figure 7:
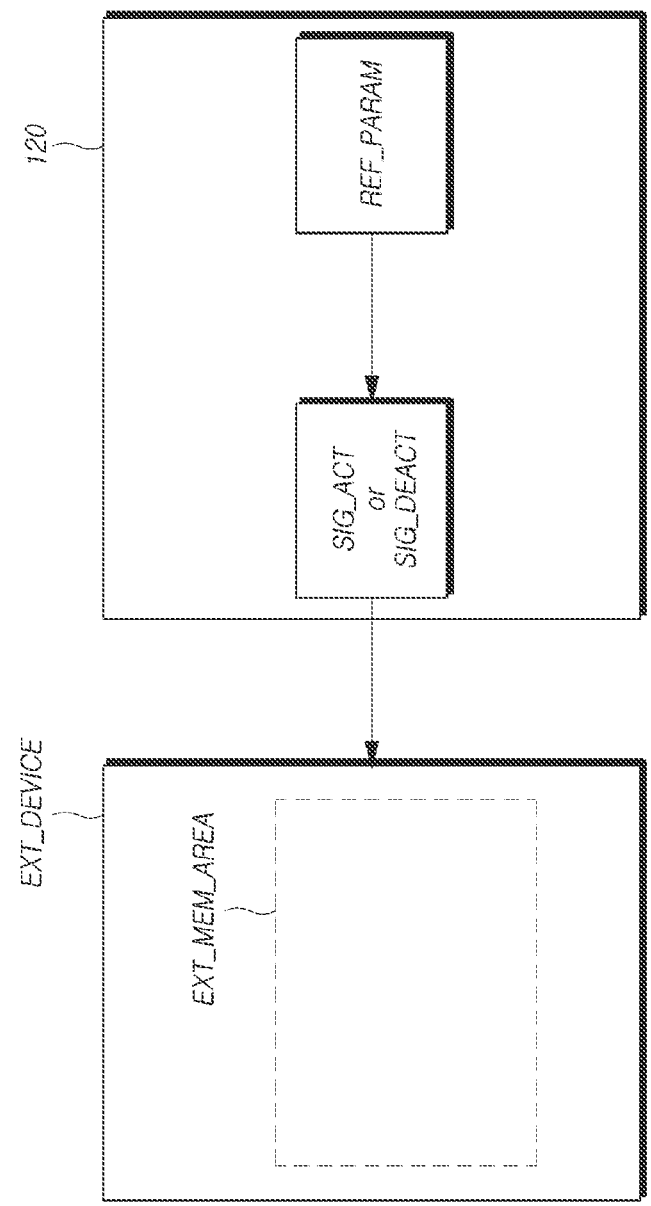
FIG. 7 is a diagram schematically illustrating an example operation of determining whether to activate the memory area based on some embodiments of the disclosed technology.
Figure 8:
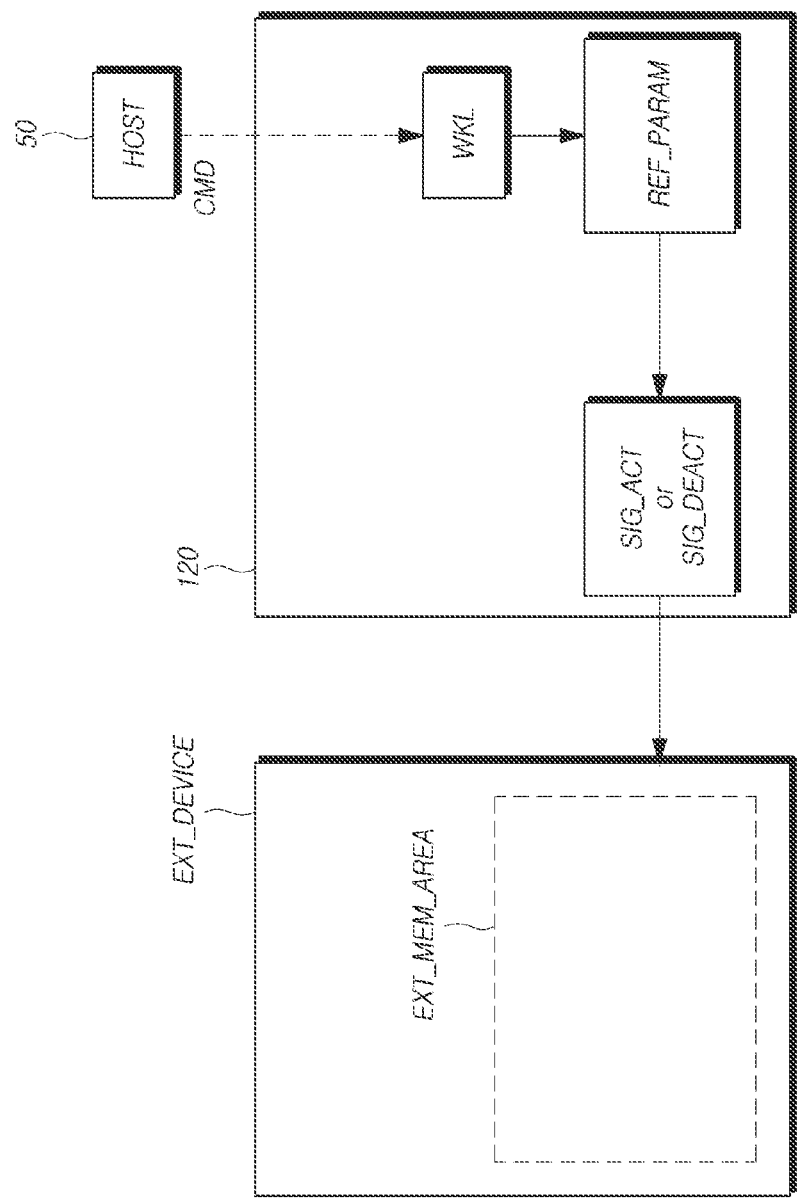
FIG. 8 is a diagram schematically illustrating an example operation of determining whether to activate the memory area based on some embodiments of the disclosed technology.

FIGS. 7 and 8 are diagrams schematically illustrating examples operations of determining whether to activate the memory area EXT_MEM_AREA based on the embodiments of the disclosed technology.

Referring to FIG. 7, the memory controller 120 may update a reference parameter REF_PARAM for the memory area EXT_MEM_AREA, and may determine whether to activate the memory area EXT_MEM_AREA, based on the reference parameter REF_PARAM. The memory controller 120 may generate the activation signal SIG_ACT when the memory controller 120 intends to activate the memory area EXT_MEM_AREA, and conversely, may generate the deactivation signal SIG_DEACT when the memory controller 120 intends to deactivate the memory area EXT_MEM_AREA. In some implementations, the reference parameter REF_PARAM may be determined based on the workload of the system. In one example, the reference parameter REF_PARAM may be determined based on how often read or write operations, which require looking up the mapping information, are performed.

A method of determining whether to activate the memory area EXT_MEM_AREA depending on the reference parameter REF_PARAM may be realized in various ways. For example, the memory controller 120 may activate the memory area EXT_MEM_AREA when the value of the reference parameter REF_PARAM is equal to or greater than a preset threshold value, and may deactivate the memory area EXT_MEM_AREA when the value of the reference parameter REF_PARAM is less than the corresponding threshold value. As another example, the memory controller 120 may activate the memory area EXT_MEM_AREA, when the value of the reference parameter REF_PARAM that is equal to or greater than the preset threshold value is maintained for a predetermined time period, and otherwise, may deactivate the memory area EXT_MEM_AREA.

The reference parameter REF_PARAM described above with reference to FIG. 7 may be updated according to various methods. Hereinafter, a method of updating the reference parameter REF_PARAM based on a workload WKL will be described in detail.

Referring to FIG. 8, the memory controller 120 may dynamically update the reference parameter REF_PARAM based on workload WKL information on a command CMD received from the host 50.

The workload WKL information may be generated in various ways. For example, the workload WKL information may include types of the command CMD (e.g., a read command/a write command) received from the host 50, the size of data corresponding to the command CMD, a pattern in which the command CMD is received, and a frequency of receiving the command CMD. Such workload WKL information may vary over time, and accordingly, the reference parameter REF_PARAM may be dynamically updated as well.

Hereinafter, specific examples of workload WKL information and specific examples of an operation in which the memory controller 120 updates the reference parameter REF_PARAM using the workload WKL information and determines whether to activate the memory area EXT_MEM_AREA, based on the updated reference parameter REF_PARAM, will be described with reference to FIGS. 9 to 14.

Figure 9:
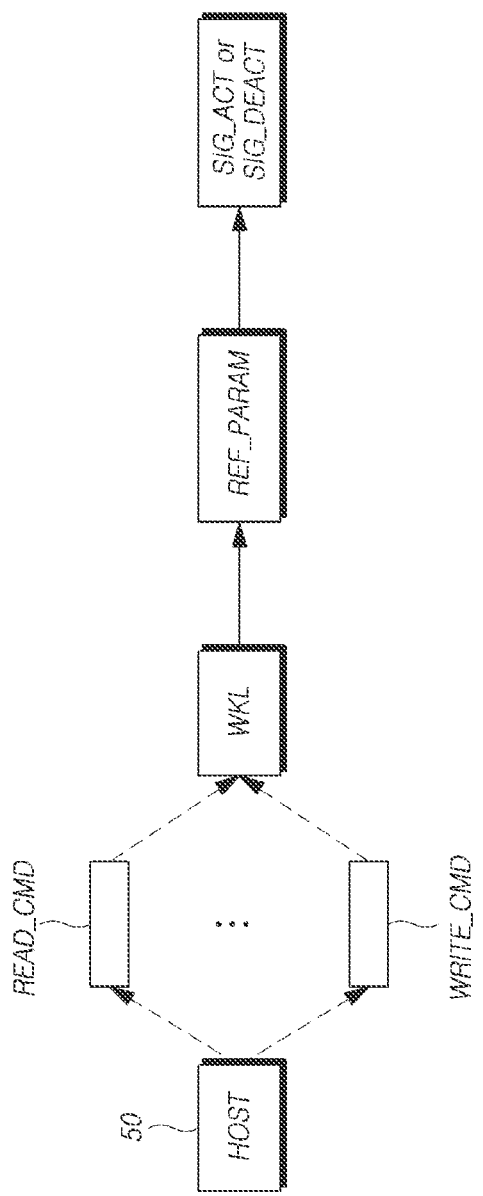
FIG. 9 is a diagram illustrating an example process of determining a workload of FIG. 8.

FIG. 9 is a diagram illustrating an example process of determining the workload WKL of FIG. 8.

Referring to FIG. 9, the workload WKL information may include information on a read command READ_CMD received from the host 50 for a predetermined time period or information on a write command WRITE_CMD received from the host 50 for a predetermined time period.

A method of updating the reference parameter REF_PARAM based on the information on the read command READ_CMD or the write command WRITE_CMD received from the host 50 may be variously determined.

For example, if mapping information on a logical address included in the read command READ_CMD is included in the memory area EXT_MEM_AREA, the memory controller 120 may determine that, since the mapping information stored in the memory area EXT_MEM_AREA has been referred to by the host 50, the mapping information is highly likely to be referred to even later. Therefore, the memory controller 120 may update the reference parameter REF_PARAM to increase the possibility that the memory area EXT_MEM_AREA is activated.

On the other hand, if mapping information on a logical address included in the read command READ_CMD is not included in the memory area EXT_MEM_AREA (or the mapping information is included in the memory area EXT_MEM_AREA but is different from actual mapping information), the memory controller 120 may determine that, since mapping information stored in the memory area EXT_MEM_AREA is not referred to by the host 50, the mapping information is less likely to be referred to even later. Therefore, the memory controller 120 may update the reference parameter REF_PARAM to decrease the possibility that the memory area EXT_MEM_AREA is activated or omit update for the reference parameter REF_PARAM.

As another example, if mapping information on a logical address included in the write command WRITE_CMD is stored in the memory area EXT_MEM_AREA, the memory controller 120 may determine that the mapping information stored in the memory area EXT_MEM_AREA will be no longer referred to. This is because, if a write operation is performed for a logical address, the value of a physical address corresponding to the logical address is changed and this means that the existing mapping information on the corresponding logical address is changed and is thus no longer used. Therefore, the memory controller 120 may update the reference parameter REF_PARAM to decrease the possibility that the memory area EXT_MEM_AREA is activated.

On the other hand, if mapping information on a logical address included in the write command WRITE_CMD is not stored in the memory area EXT_MEM_AREA, the memory controller 120 may omit update for the reference parameter REF_PARAM.

Even in the case where mapping information on a logical address included in the write command WRITE_CMD is stored in the memory area EXT_MEM_AREA, if there is a history in which the mapping information on the corresponding logical address is referred to by another read command READ_CMD generated previously, the memory controller 120 may update the reference parameter REF_PARAM in a direction in which the memory area EXT_MEM_AREA is highly likely to be activated or may omit update for the reference parameter REF_PARAM. This is because, in the case where the mapping information on the corresponding logical address is referred to by the host 50, when the write command WRITE_CMD is completely executed and mapping information on the corresponding logical address is newly generated, the newly generated mapping information has high possibility to be referred to later by the host 50.

Figure 10:
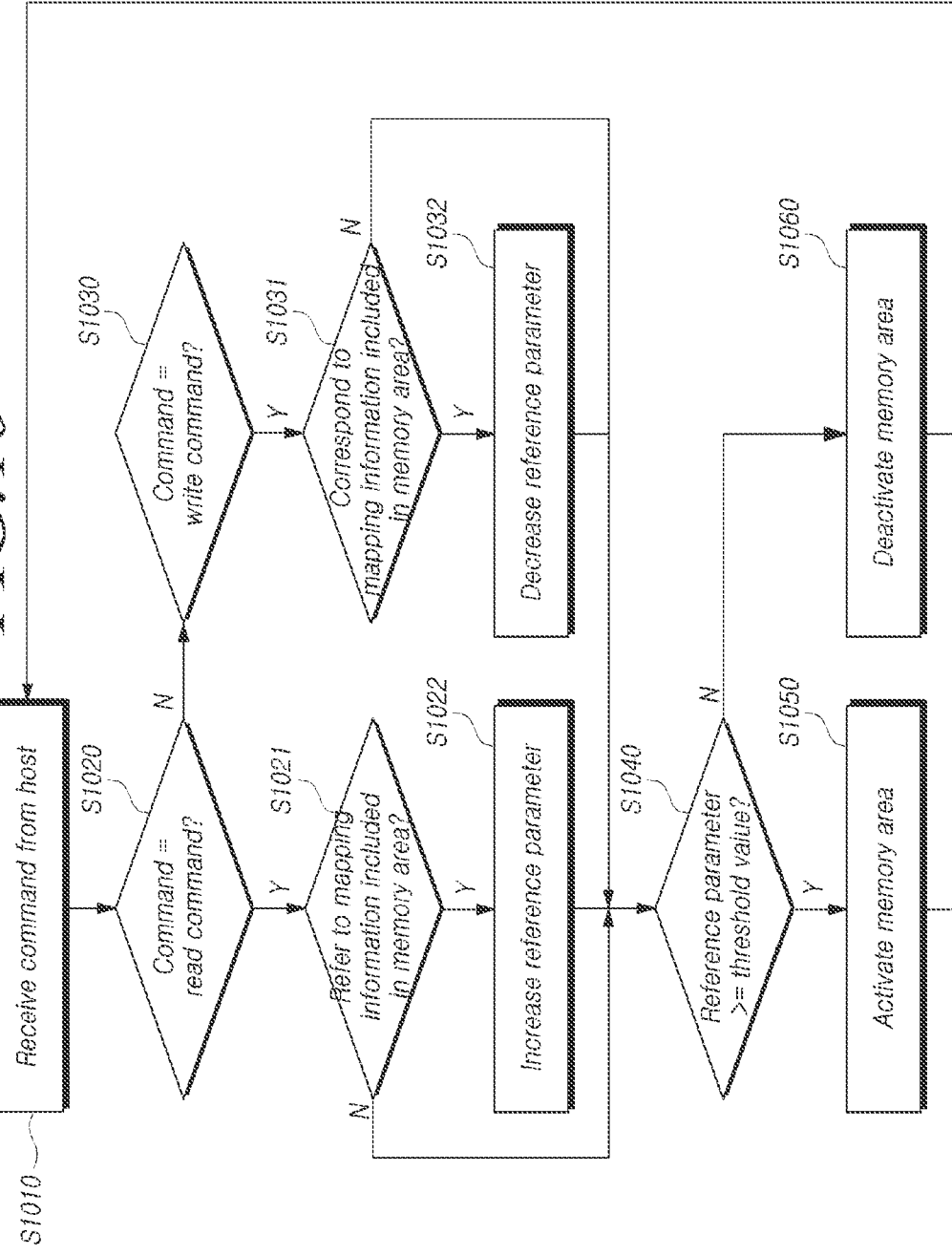
FIG. 10 is a flow chart illustrating an example process of performing an operation illustrated in FIG. 9.

FIG. 10 is a flow chart illustrating an example process of performing the operation illustrated in FIG. 9.

In some implementations, this example process may be performed by the memory controller 120 described above. Further, it is assumed that the memory controller 120 activates the memory area EXT_MEM_AREA when the value of the reference parameter REF_PARAM is equal to or greater than the threshold value and deactivates the memory area EXT_MEM_AREA when the value of the reference parameter REF_PARAM is less than the threshold value.

First, the memory controller 120 may receive a command from the host 50 (S1010). The memory controller 120 first determines whether the command received from the host 50 is a read command READ_CMD (S1020).

If the command received from the host 50 is the read command READ_CMD (S1020-Y), the memory controller 120 determines whether the received read command READ_CMD refers to mapping information included in the memory area EXT_MEM_AREA (S1021).

If, at the step S1021, the received read command READ_CMD refers to the mapping information included in the memory area EXT_MEM_AREA (S1021-Y), the memory controller 120 increases the reference parameter REF_PARAM (S1022), and then, enters step S1040. On the other hand, if the received read command READ_CMD does not refer to the mapping information included in the memory area EXT_MEM_AREA (S1021-N), the memory controller 120 immediately enters the step S1040.

If the command received from the host 50 is not the read command READ_CMD (S1020-N), the memory controller 120 determines whether the received command is a write command WRITE_CMD (S1030).

If the command received from the host 50 is the write command WRITE_CMD (S1030-Y), the memory controller 120 determines whether a logical address included in the received write command WRITE_CMD corresponds to mapping information included in the memory area EXT_MEM_AREA (S1031).

If, at the step S1031, the received write command WRITE_CMD corresponds to the mapping information included in the memory area EXT_MEM_AREA (S1031-Y), the memory controller 120 decreases the reference parameter REF_PARAM (S1032), and then, enters the step S1040. On the other hand, if the received write command WRITE_CMD does not correspond to the mapping information included in the memory area EXT_MEM_AREA (S1031-N), the memory controller 120 immediately enters the step S1040.

The memory controller 120 determines whether the value of the reference parameter REF_PARAM is equal to or greater than the threshold value (S1040). If the value of the reference parameter REF_PARAM is equal to or greater than the threshold value (S1040-Y), the memory controller 120 controls the memory area EXT_MEM_AREA to be activated (S1050). On the other hand, if the value of the reference parameter REF_PARAM is less than the threshold value (S1040-N), the memory controller 120 controls the memory area EXT_MEM_AREA to be deactivated (S1060).

Figure 11:
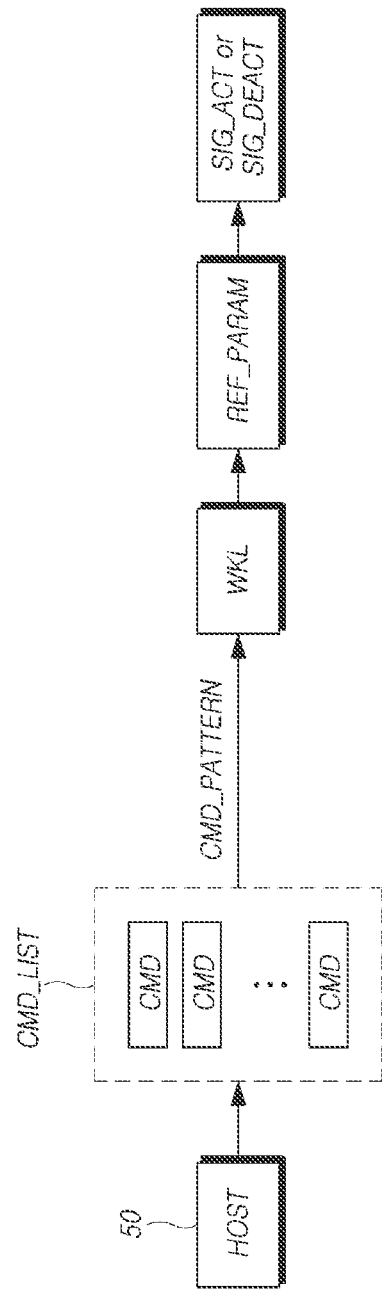
FIG. 11 is a diagram illustrating an example process of determining a workload of FIG. 8.

FIG. 11 is a diagram illustrating an example process of determining the workload WKL of FIG. 8.

Referring to FIG. 11, the workload WKL information may include information on a pattern CMD_PATTERN of logical addresses corresponding to one or more commands CMD received from the host 50 for a predetermined time period.

The memory controller 120 may receive one or more commands CMD from the host 50 for the predetermined time period, and thereby, may determine the pattern CMD_PATTERN from a command list CMD_LIST including the one or more commands CMD received for the predetermined time period.

For instance, the memory controller 120 may determine whether the pattern CMD_PATTERN is a sequential pattern or a random pattern.

The fact that the pattern CMD_PATTERN is a sequential pattern may mean that logical addresses corresponding to the commands CMD, respectively, included in the command list CMD_LIST have a tendency to be consecutive to each other. For example, in the case where the logical addresses corresponding to the commands CMD, respectively, included in the command list CMD_LIST are consecutive such as 100, 101, 102, 103, . . . or 120, 119, 118, . . . , the memory controller 120 may determine that the pattern of the commands CMD is a sequential pattern. However, even though not all of the logical addresses corresponding to the commands CMD, respectively, included in the command list CMD_LIST are consecutive to each other, if the percentage of commands CMD consecutive to each other is equal to or greater than a specific threshold percentage, the memory controller 120 may determine that the pattern of the commands CMD is a sequential pattern.

On the other hand, the fact that the pattern CMD_PATTERN is a random pattern may mean that logical addresses corresponding to the commands CMD, respectively, included in the command list CMD_LIST have no particular tendency. For example, in the case where the logical addresses corresponding to the commands CMD, respectively, included in the command list CMD_LIST are irregularly changed such as 100, 200, 80, 145, . . . or 90, 93, 45, 182, . . . , the memory controller 120 may determine that the pattern of the commands CMD is a random pattern. However, even though some of the commands CMD included in the command list CMD_LIST have a particular tendency (e.g., logical addresses corresponding to commands are consecutive to each other), if the percentage of commands CMD having the particular tendency is equal to or less than a specific threshold percentage, the memory controller 120 may determine that the pattern of the commands CMD is a random pattern.

If the pattern CMD_PATTERN is determined in this way, the memory controller 120 may update the value of the reference parameter REF_PARAM depending on the pattern CMD_PATTERN of the logical addresses corresponding to the one or more commands CMD received from the host 50 for the predetermined time period.

For example, if the pattern CMD_PATTERN is a random pattern, the memory controller 120 may update the value of the reference parameter REF_PARAM to increase the possibility that the memory area EXT_MEM_AREA is activated. This is because, if the pattern CMD_PATTERN is a random pattern, there is a possibility that the mapping information stored in the memory area EXT_MEM_AREA is continuously referred to and because, when the mapping information stored in the memory area EXT_MEM_AREA is referred to once, there is a high possibility that the mapping information is continuously referred to later due to locality.

On the other hand, if the pattern CMD_PATTERN is a sequential pattern, the memory controller 120 may update the value of the reference parameter REF_PARAM to decrease the possibility that the memory area EXT_MEM_AREA is activated. This is because, if the pattern CMD_PATTERN is a sequential pattern, it is highly likely that the values of logical addresses for searching for mapping information are sequentially changed, and in this case, mapping information referred to once is highly unlikely to be referred to any more.

Figure 12:
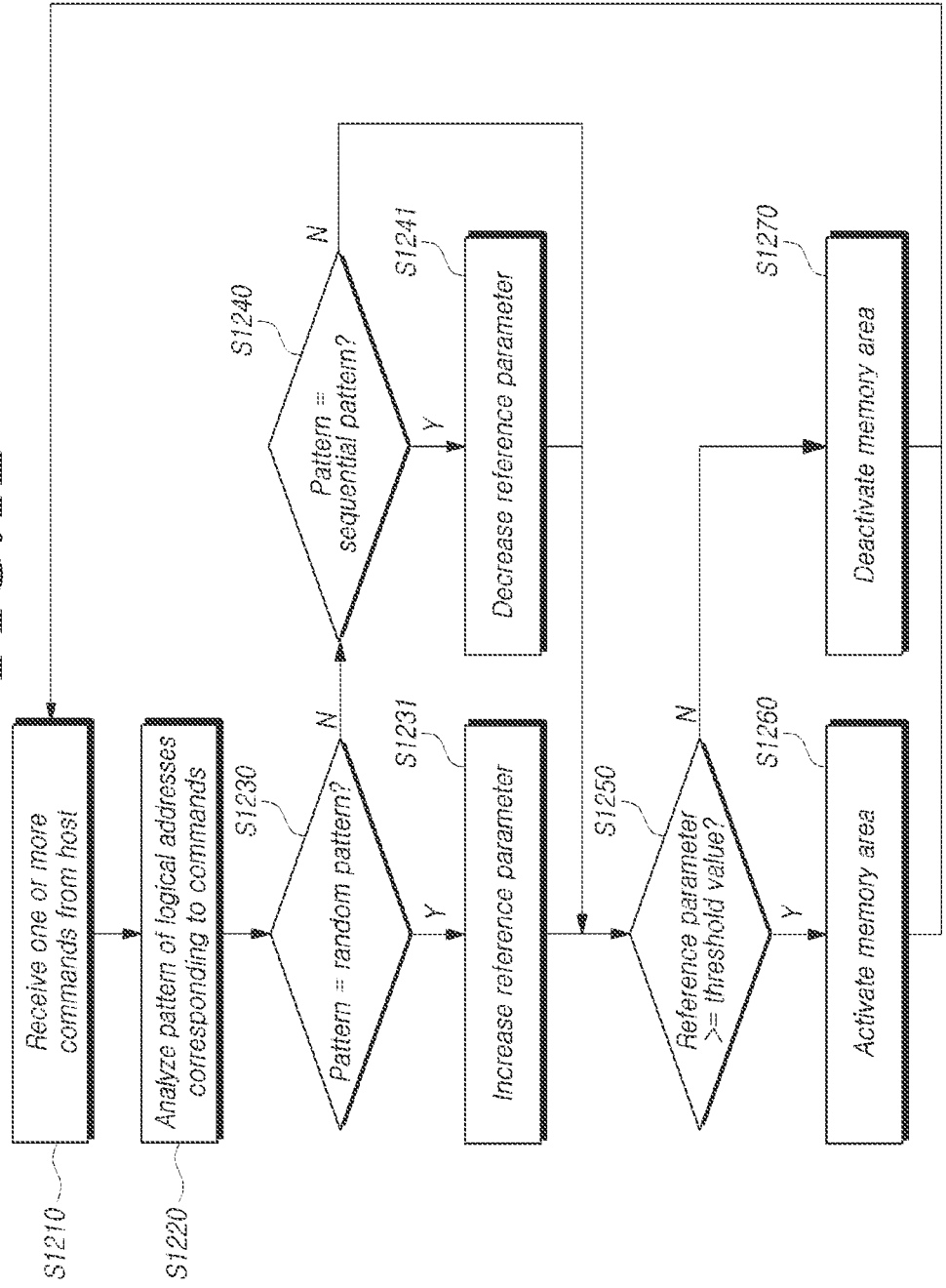
FIG. 12 is a flow chart illustrating an example process of performing an operation illustrated in FIG. 11.

FIG. 12 is a flow chart illustrating an example process of performing the operation illustrated in FIG. 11.

In some implementations, the operation shown in FIG. 12 is performed by the memory controller 120 described above. Further, it is assumed that the memory controller 120 activates the memory area EXT_MEM_AREA when the value of the reference parameter REF_PARAM is equal to or greater than the threshold value and deactivates the memory area EXT_MEM_AREA when the value of the reference parameter REF_PARAM is less than the threshold value.

First, the memory controller 120 may receive one or more commands CMD from the host 50 for a predetermined time period (S1210). The memory controller 120 may analyze the pattern CMD_PATTERN of logical addresses corresponding to the one or more commands CMD received from the host 50 (S1220).

The memory controller 120 may determine whether the pattern CMD_PATTERN is a random pattern (S1230). If the pattern CMD_PATTERN is a random pattern (S1230-Y), the memory controller 120 may increase the reference parameter REF_PARAM (S1231), and then, may enter step S1250.

On the other hand, in the case where the pattern CMD_PATTERN is not a random pattern (S1230-N), the memory controller 120 may determine whether the pattern CMD_PATTERN is a sequential pattern (S1240). If the pattern CMD_PATTERN is a sequential pattern (S1240-Y), the memory controller 120 may decrease the reference parameter REF_PARAM (S1241), and then, may enter the step S1250. In the case where the pattern CMD_PATTERN is not even a sequential pattern, the memory controller 120 immediately enters the step S1250.

The memory controller 120 determines whether the value of the reference parameter REF_PARAM is equal to or greater than the threshold value (S1250). If the value of the reference parameter REF_PARAM is equal to or greater than the threshold value (S1250-Y), the memory controller 120 controls the memory area EXT_MEM_AREA to be activated (S1260). On the other hand, if the value of the reference parameter REF_PARAM is less than the threshold value (S1250-N), the memory controller 120 controls the memory area EXT_MEM_AREA to be deactivated (S1270).

Figure 13:
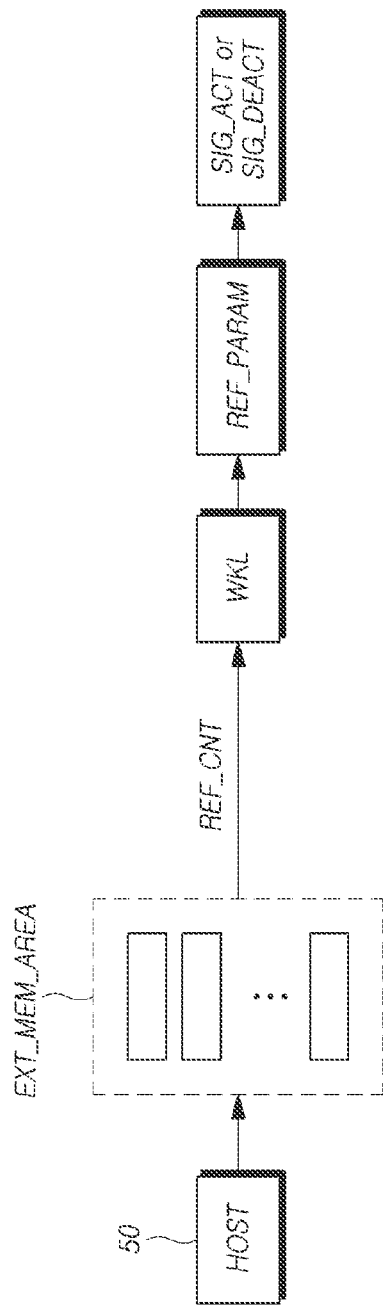
FIG. 13 is a diagram illustrating an example process of determining a workload of FIG. 8.

FIG. 13 is a diagram illustrating an example process of determining the workload WKL of FIG. 8.

Referring to FIG. 13, the workload WKL information may include information on a reference frequency REF_CNT, which is a frequency of referring to the memory area EXT_MEM_AREA responsive to commands received from the host 50 for a predetermined time period.

The fact that the memory area EXT_MEM_AREA is referred to may mean that a command transmitted from the host 50 to the memory controller 120 includes a portion of the mapping information included in the memory area EXT_MEM_AREA.

By determining the reference frequency REF_CNT, the memory controller 120 may update the value of the reference parameter REF_PARAM to increase the possibility that the memory area EXT_MEM_AREA is activated, when the reference frequency REF_CNT is equal to or greater than a threshold frequency, and may update the value of the reference parameter REF_PARAM to decrease the possibility that the memory area EXT_MEM_AREA is activated, when the reference frequency REF_CNT is less than the threshold frequency.

Figure 14:
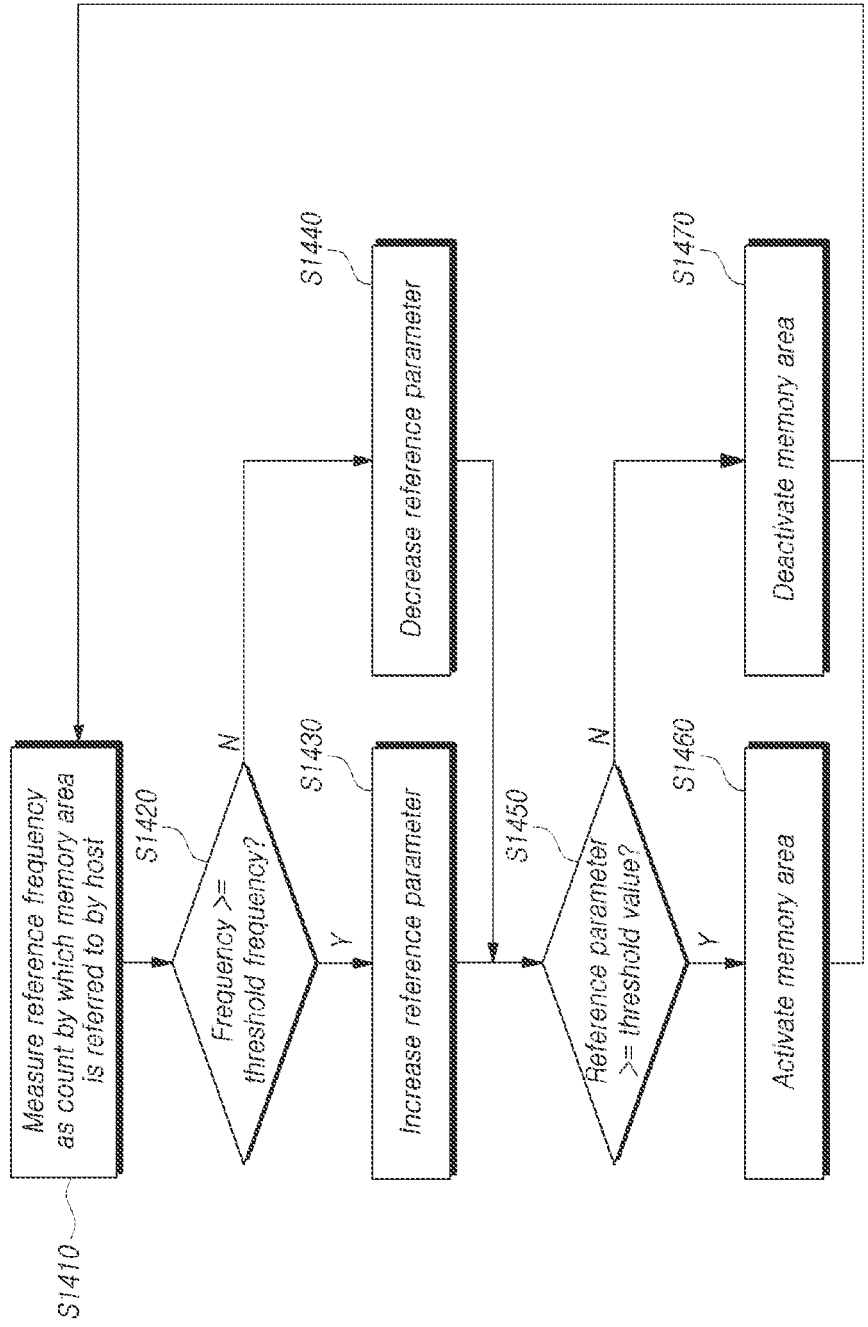
FIG. 14 is a flow chart illustrating an example process of performing an operation illustrated in FIG. 13.

FIG. 14 is a flow chart illustrating an example process of performing the operation illustrated in FIG. 13.

In some implementations, the operation shown in FIG. 14 is performed by the memory controller 120 described above. Further, it is assumed that the memory controller 120 activates the memory area EXT_MEM_AREA when the value of the reference parameter REF_PARAM is equal to or greater than the threshold value and deactivates the memory area EXT_MEM_AREA when the value of the reference parameter REF_PARAM is less than the threshold value.

First, the memory controller 120 measures the reference frequency by counting the number of iterations where the memory area EXT_MEM_AREA has been referred to responsive to commands received from the host 50 for a predetermined time period (S1410).

The memory controller 120 determines whether the reference frequency is equal to or greater than the threshold frequency (S1420). If the reference frequency is equal to or greater than the threshold frequency (S1420-Y), the memory controller 120 increases the reference parameter REF_PARAM (S1430), and then, enters step S1450. On the other hand, if the reference frequency is less than the threshold frequency (S1420-N), the memory controller 120 decreases the reference parameter REF_PARAM (S1440), and then, enters the step S1450.

The memory controller 120 determines whether the value of the reference parameter REF_PARAM is equal to or greater than the threshold value (S1450). If the value of the reference parameter REF_PARAM is equal to or greater than the threshold value (S1450-Y), the memory controller 120 controls the memory area EXT_MEM_AREA to be activated (S1460). On the other hand, if the value of the reference parameter REF_PARAM is less than the threshold value (S1450-N), the memory controller 120 controls the memory area EXT_MEM_AREA to be deactivated (S1470).

Figure 15:
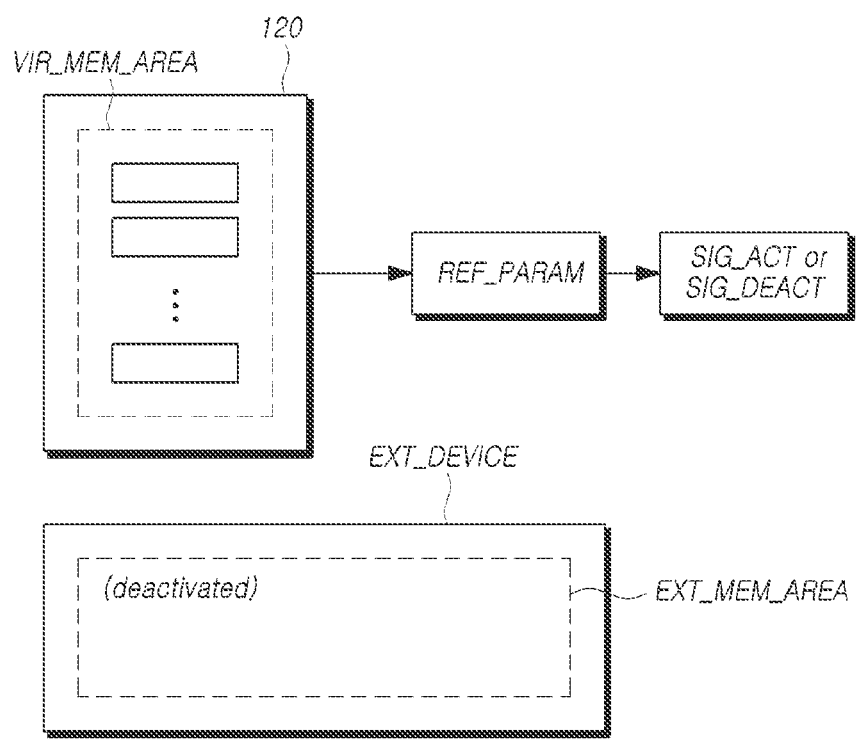
FIG. 15 is a diagram illustrating an example operation of updating a reference parameter based on a virtual memory area based on some embodiments of the disclosed technology.

FIG. 15 is a diagram illustrating an example operation of updating a reference parameter based on a virtual memory area based on the embodiments of the disclosed technology.

A virtual memory area VIR_MEM_AREA may be positioned inside the memory controller 120, and may be used to update the reference parameter REF_PARAM in the case where the memory area EXT_MEM_AREA positioned in the external device EXT_DEVICE is in a deactivated state.

If the memory area EXT_MEM_AREA is in the deactivated state, the host 50 no longer refers to the memory area EXT_MEM_AREA when transmitting a command to the memory controller 120. Thus, in the case where the reference parameter REF_PARAM is updated depending on whether the mapping information stored in the memory area EXT_MEM_AREA is referred to, a problem may arise in that the reference parameter REF_PARAM is no longer updated and thus the memory area EXT_MEM_AREA is continuously maintained in the deactivated state.

Therefore, the memory controller 120 may create the virtual memory area VIR_MEM_AREA in the memory controller 120, and may update the reference parameter REF_PARAM even when the memory area EXT_MEM_AREA is in the deactivated state, by using the virtual memory area VIR_MEM_AREA.

In detail, when the memory area EXT_MEM_AREA is in the deactivated state, the memory controller 120 may update the reference parameter REF_PARAM based on whether a logical address included in a command received from the host 50 and a logical address included in mapping information stored in the virtual memory area VIR_MEM_AREA correspond to each other. However, the mapping information stored in the virtual memory area VIR_MEM_AREA is used only to update the reference parameter REF_PARAM, and is not used to determine a physical address actually mapped to a logical address included in a command received from the host 50. Namely, the mapping information stored in the virtual memory area VIR_MEM_AREA is different from mapping information used for the memory controller 120 to determine a physical address mapped to a logical address included in a command received from the host 50.

For example, when the memory area EXT_MEM_AREA is in the deactivated state, if a logical address corresponding to a command received from the host 50 is searched for in the mapping information stored in the virtual memory area VIR_MEM_AREA, the memory controller 120 may increase the reference parameter REF_PARAM, and, on the contrary, if not searched for, the memory controller 120 may decrease the reference parameter REF_PARAM.

The operation of updating the reference parameter REF_PARAM through the virtual memory area VIR_MEM_AREA in this way may be performed only in the case where the memory area EXT_MEM_AREA is in the deactivated state.

That is to say, in the case where the memory area EXT_MEM_AREA is converted into the activated state from the deactivated state, the memory controller 120 may deactivate the virtual memory area VIR_MEM_AREA so that the virtual memory area VIR_MEM_AREA is not used. At this time, the mapping information stored in the virtual memory area VIR_MEM_AREA may be loaded to the memory area EXT_MEM_AREA or may be erased.

Figure 16:
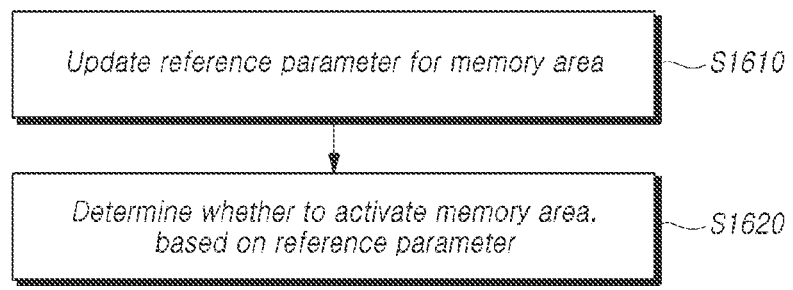
FIG. 16 shows an example method for operating the memory system based on some embodiments of the disclosed technology.

FIG. 16 shows an example method for operating the memory system 100 based on some embodiments of the disclosed technology.

Referring to FIG. 16, first, the method for operating the memory system 100 may include updating a reference parameter for a memory area (S1610). All or some of mapping information between logical addresses and physical addresses may be stored in a first device, and the memory area may be positioned in a second device different from the first device.

The first device may be, for example, the memory controller 120 included in the memory system 100, and the second device may be, for example, the host 50 which transmits a command to the memory controller 120.

In the case where the second device is the host 50, at the step S1610, the memory controller 120 included in the memory system 100 may dynamically update the reference parameter based on workload information on a command received from the host 50.

As described above with reference to FIGS. 9 to 14, the workload information may include 1) information on a read command received from the host 50 for a predetermined time period or a write command received from the host 50 for a predetermined time period, 2) information on a pattern of logical addresses corresponding to one or more commands received from the host 50 for a predetermined time period, or 3) information on a reference frequency obtained by counting the number of iterations where the memory area is referred to responsive to commands received from the host 50 for a predetermined time period.

The method for operating the memory system 100 may include step S1620 in which the first device determines whether to activate the memory area, based on the reference parameter. A method of determining whether to activate the memory area may be the same as the methods described above with reference to FIGS. 9 to 15.

In some implementations, the above-described operation of the memory controller 120 may be controlled by the control circuit 123, and may be performed in such a manner that the processor 124 executes (drives) a firmware in which general operations of the memory controller 120 are programmed.

Figure 17:
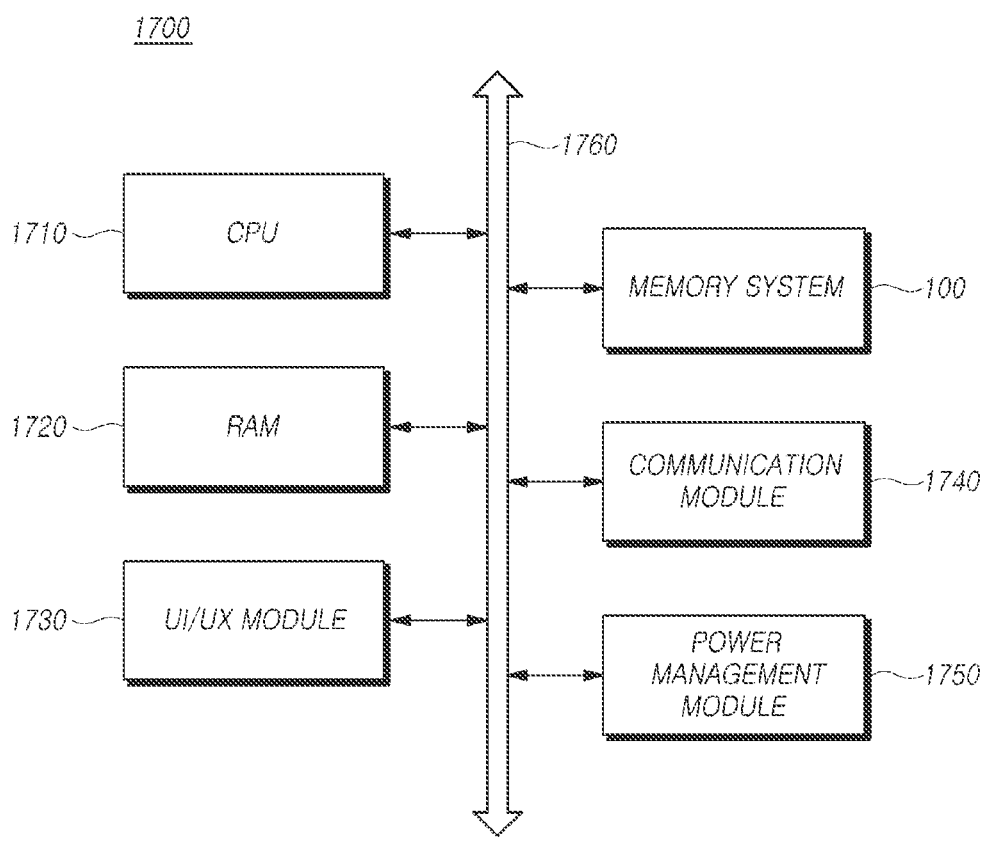
FIG. 17 is a block diagram schematically illustrating an example of a computing system based on some embodiments of the disclosed technology.

FIG. 17 is a block diagram schematically illustrating an example of a computing system 1700 based on some embodiments of the disclosed technology.

Referring to FIG. 17, the computing system 1700 based on the embodiments of the disclosed technology may include a memory system 100, a central processing unit (CPU) 1710 for controlling general operations of the computing system 1700, a RAM 1720 for storing data and information related with operations of the computing system 1700, a UI/UX (user interface/user experience) module 1730 for providing use environment to a user, a communication module 1740 for communicating with an external device in a wired and/or wireless manner and a power management module 1750 for managing power used by the computing system 1700, which are electrically coupled to a system bus 1760.

The computing system 1700 based on the embodiments of the disclosed technology may include a PC (personal computer), a mobile terminal such as a smartphone and a tablet or various electronic devices.

The computing system 1700 based on the embodiments may further include a battery for supplying an operating voltage, and may further include an application chipset, a graphic-related module, a camera image processor (CIS), a DRAM and so forth. Besides, it is obvious to those skilled in the art that the computing system 1700 may include other components.

The memory system 100 may include not only a device which stores data in a magnetic disk, such as a hard disk drive (HDD), but also a device which stores data in a nonvolatile memory, such as a solid state drive (SSD), a universal flash storage (UFS) device and an embedded MMC (eMMC) device. The nonvolatile memory may include a ROM (read only memory), a PROM (programmable ROM), an EPROM (electrically programmable ROM), an EEPROM (electrically erasable and programmable ROM), a flash memory, a PRAM (phase-change RAM), an MRAM (magnetic RAM), an RRAM (resistive RAM), and an FRAM (ferroelectric RAM). In addition, the memory system 100 may be realized into various types of storage devices, and may be mounted in various electronic devices.

As is apparent from the above descriptions, according to the embodiments of the disclosed technology, it is possible to provide the memory system 100, the memory controller 120 and a method for operating the memory system 100, capable of quickly processing a command received from the host 50.

Also, according to the embodiments of the disclosed technology, it is possible to provide the memory system 100, the memory controller 120 and a method for operating the memory system 100, capable of allowing the host 50 to quickly refer to necessary mapping information.

Although exemplary embodiments of the disclosed technology have been described for illustrative purposes, those skilled in the art will appreciate that various modifications, additions and substitutions are possible, without departing from the scope and spirit of the disclosed technology. Therefore, the embodiments disclosed above and in the accompanying drawings should be considered in a descriptive sense only and not for limiting the technological scope. The technological scope of the disclosed technology is not limited by the embodiments and the accompanying drawings. The spirit and scope of the disclosed technology should be interpreted by the appended claims and encompass all equivalents falling within the scope of the appended claims.

What is claimed is:

1. A memory system comprising a memory device located inside the memory system to store mapping information between logical addresses and physical addresses and a memory controller in communication with the memory device to control the memory device,
   wherein the memory controller is in communication with a host that is located outside the memory system and includes a memory area configured to store the mapping information, and wherein the memory controller is configured to:
   update a reference parameter for at least part of the mapping information stored in the memory area located in the host, based on workload information associated with a command received from the host; and
   determine whether to activate the memory area in the host to store the at least part of the mapping information in the memory area in a case that the reference parameter is equal to or greater than a threshold value or deactivate the memory area in the host in a case that the reference parameter is less than the threshold value,
   wherein the host refers to the at least part of the mapping information in the memory area in the host in a case that the memory area is activated, and the host refers to the mapping information in the memory device located inside the memory system without referring to the memory area in the host in a case that the memory area is deactivated.

2. The memory system according to claim 1, wherein the workload information is determined based on a read command or a write command received from the host for a predetermined time period.

3. The memory system according to claim 2,
   wherein, upon receipt from the host of a read command referring to the mapping information stored in the memory area, the memory controller updates a value of the reference parameter to increase an activation possibility of the memory area, and
   wherein, upon receipt from the host of a write command for a logical address corresponding to the mapping information stored in the memory area, the memory controller updates a value of the reference parameter to decrease an activation possibility of the memory area.

4. The memory system according to claim 1, wherein the workload information is determined based on a pattern of logical addresses corresponding to one or more commands received from the host for a predetermined time period.

5. The memory system according to claim 4,
wherein, when the pattern of logical addresses is a random pattern, the memory controller updates a value of the reference parameter to increase an activation possibility of the memory area, and
wherein, when the pattern of logical addresses is a sequential pattern, the memory controller updates a value of the reference parameter to decrease an activation possibility of the memory area.

6. The memory system according to claim 1, wherein the workload information is determined based on a frequency of referring to the memory area responsive to commands received from the host for a predetermined time period.

7. The memory system according to claim 6,
wherein, when the frequency of referring to the memory area is equal to or greater than a threshold frequency, the memory controller updates a value of the reference parameter to increase an activation possibility of the memory area, and
wherein, when the frequency of referring to the memory area is less than the threshold frequency, the memory controller updates a value of the reference parameter to decrease an activation possibility of the memory area.

8. The memory system according to claim 1, wherein, when the memory area is in a deactivated state, the memory controller updates the reference parameter based on whether a logical address included in a command received from the host matches a logical address included in mapping information stored in a virtual memory area positioned in the memory controller.

9. The memory system according to claim 8, wherein the memory controller deactivates the virtual memory area when the memory area is converted into an activated state from the deactivated state.

10. A memory controller comprising: a memory interface for communicating with a memory device located inside a memory system and configured to store mapping information between logical addresses and physical addresses and a control circuit including a processor for controlling the memory device and for communicating with a host that is located outside the memory system and includes a memory area configured to store the mapping information,
wherein the control circuit is configured to:
update a reference parameter for at least part of the mapping information stored in the memory area located in the host, based on workload information associated with a command received from the host; and
determine whether to activate the memory area in the host to store the at least part of the mapping information in the memory area in a case that the reference parameter is equal to or greater than a threshold value or deactivate the memory area in the host in a case that the reference parameter is less than the threshold value,
wherein the host refers to the at least part of the mapping information in the memory area in the host in a case that the memory area is activated, and the host refers to the mapping information in the memory device located inside the memory system without referring to the memory area in the host in a case that the memory area is deactivated.

11. The memory controller according to claim 10, wherein the workload information is determined based on a read command or a write command received from the host for a predetermined time period.

12. The memory controller according to claim 10, wherein the workload information is determined based on a pattern of logical addresses corresponding to one or more commands received from the host for a predetermined time period.

13. The memory controller according to claim 10, wherein the workload information is determined based on a frequency of referring to the memory area responsive to commands received from the host for a predetermined time period.

14. The memory controller according to claim 10, wherein, when the memory area is in a deactivated state, the control circuit updates the reference parameter based on whether a logical address included in a command received from the host matches a logical address included in mapping information stored in a virtual memory area positioned in the memory controller.

15. The memory controller according to claim 14, wherein the control circuit deactivates the virtual memory area when the memory area is converted into an activated state from the deactivated state.

16. A method for operating a memory system, comprising:
updating, by a first device which is located inside the memory system and in communication with a second device that is located outside the memory system and includes a memory area configured to store the mapping information, a reference parameter associated with the memory area located in the second device in which at least part of mapping information for mapping between logical addresses and physical addresses is stored, based on workload information on a command received from the second device different from the first device; and
determining, by the first device, whether to activate the memory area in the second device in a case that the reference parameter is equal to or greater than a threshold value or deactivate the memory area in the second device in a case that the reference parameter is less than the threshold area,
wherein the second device refers to at least part of the mapping information in the memory area located in the second device in a case that the memory area located in the second device is activated, and the second device refers to the mapping information in the memory system in a case that the memory area located in the second device is deactivated, and
wherein the second device includes the memory area.

17. The method according to claim 16, wherein the first device includes a memory controller included in the memory system, and the second device includes a host configured to transmit a command to the memory controller.

18. The method according to claim 17, wherein the workload information is determined based on a read command or a write command received from the host for a predetermined time period.

19. The method according to claim 17, wherein the workload information is determined based on a pattern of logical addresses corresponding to one or more commands received from the host for a predetermined time period.

20. The method according to claim 17, wherein the workload information is determined based on a frequency of referring to the memory area responsive to commands received from the host for a predetermined time period.

* * * * *